(12) United States Patent
Sandford

(10) Patent No.: US 6,851,243 B1
(45) Date of Patent: *Feb. 8, 2005

(54) ELEMENTS TO ERECT FEMALE AND MALE BLANKING DIES FOR A DIE CUTTING AND/OR BLANKING MACHINE

(75) Inventor: Peter E. Sandford, 176 Stronach Crescent, London, Ontario (CA), N5V 3A1

(73) Assignee: Peter E. Sandford, London (CA)

( * ) Notice: Subject to any disclaimer, the term of this patent is extended or adjusted under 35 U.S.C. 154(b) by 129 days.

This patent is subject to a terminal disclaimer.

(21) Appl. No.: 09/692,721

(22) Filed: Oct. 20, 2000

(30) Foreign Application Priority Data

Oct. 20, 1999 (CA) .............................................. 2287035

(51) Int. Cl.[7] .............................................. B26D 1/11
(52) U.S. Cl. ...................... 52/645; 83/698.71; 403/252; 403/381
(58) Field of Search ....................... 83/698.71; 403/381, 403/374.1, 374.2, 374.3, 252, 256, 257, 260, 61, 261, 407, 382; 248/346.07, 313, 207.1, 224.51; 52/645, 646, 653.1, 653.2; 483/493, 477, 478, 479

(56) References Cited

U.S. PATENT DOCUMENTS

| | | | |
|---|---|---|---|
| 2,557,504 A | 6/1951 | Holmes | |
| 2,845,011 A | 7/1958 | Schilling | |
| 3,249,272 A | 5/1966 | Scarpa | |
| 5,337,639 A | 8/1994 | Morrison | |
| 5,735,442 A | 4/1998 | Emrich | |
| 5,893,825 A | 4/1999 | Rebeaud | |
| 6,203,482 B1 * | 3/2001 | Sandford | ...................... 493/61 |
| 6,477,930 B1 * | 11/2002 | Sandford | ...................... 83/162 |

\* cited by examiner

Primary Examiner—Charles Goodman
(74) Attorney, Agent, or Firm—Shin Hung; Borden Ladner Gervais LLP

(57) ABSTRACT

Elements are provided to erect a female blanking die for a die cutting machine for die cutting and/or blanking a carton blank, as well as for erecting a combination male blanking die/female blanking die. The elements include the following specifically-described elements: jogger members; auxiliary adjustable support members; grid orientation cylinders; grid support brackets; template corner locking clamps; center line orientation cylinders; center line clamps; and rail connecting elements. The rail connecting elements serve to erect a rectangular framework for the universal press frame of the female blanking die wherein the front and the rear rails are disposed at a higher level than the side rails. Embodiments of jogger members are provided which are selectively-disposed along the internal perimeter of the rectangular framework for erecting the female blanking die, each such jogger member having a particularly-recited structure. Center line orientation clamps and center line orientation cylinders are provided, in combination with a template, to place the template accurately within the rectangular framework. Grid support brackets are provided in the rectangular framework, and grid orientation cylinders are provided on the template for holding a grid which comprises a plurality of intersecting rails, the pattern of the intersecting rails having a predefined shape of the abutting portions of blanked cartons. The grid is adapted to be disposed within slots atop the grid support brackets and in the grid support cylinder. Auxiliary adjustable support members may also selectively-disposed along the internal perimeter of the rectangular framework for erecting the female blanking die. Legs support the rails constituting a universal press frame for erecting the female blanking die, the legs being later removed to provide the female blanking die.

14 Claims, 14 Drawing Sheets

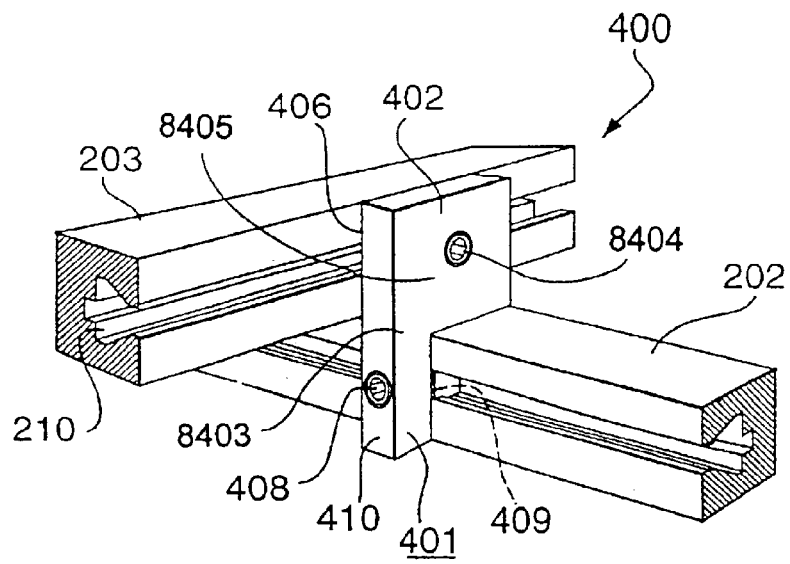
FIG. 4
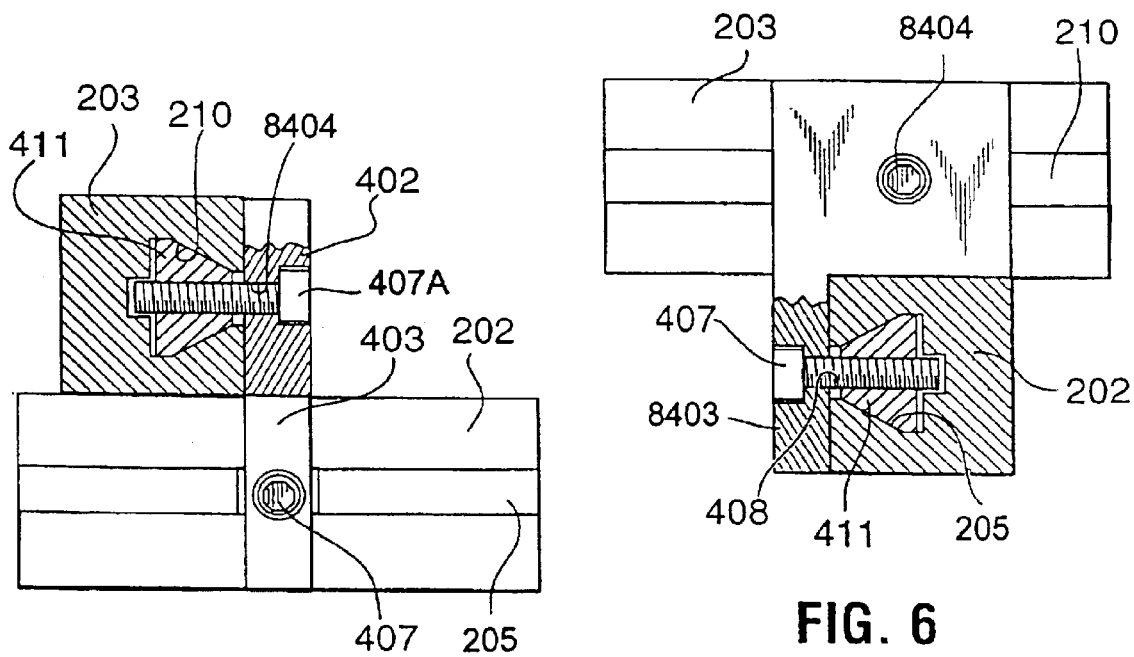
FIG. 5
FIG. 6

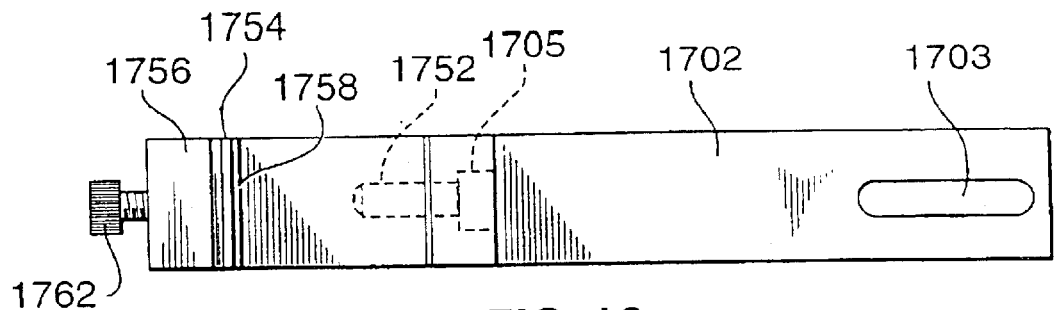
FIG. 18
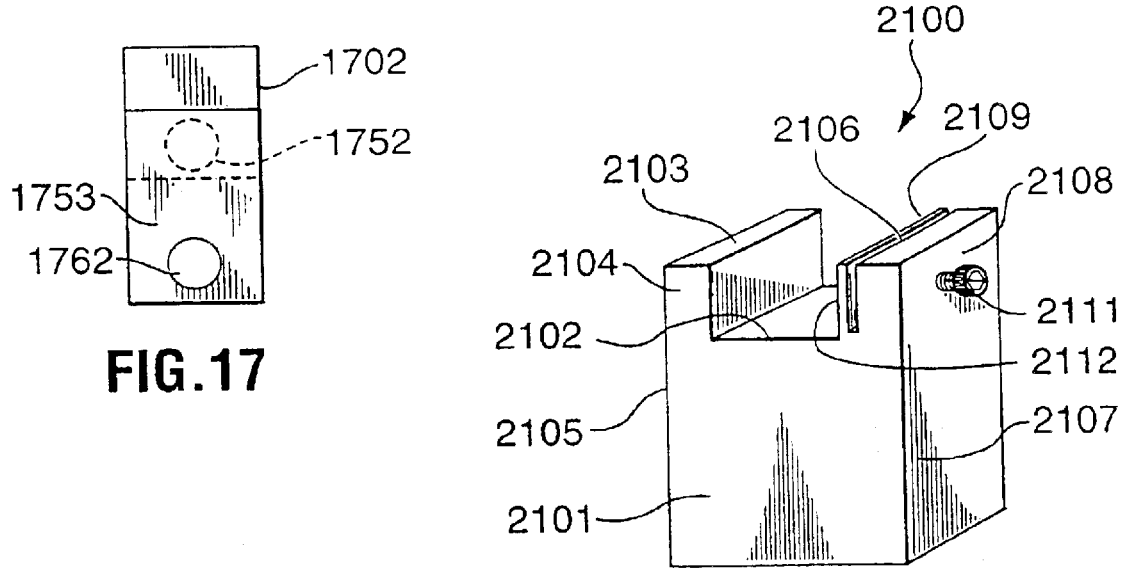
FIG. 17
FIG. 19
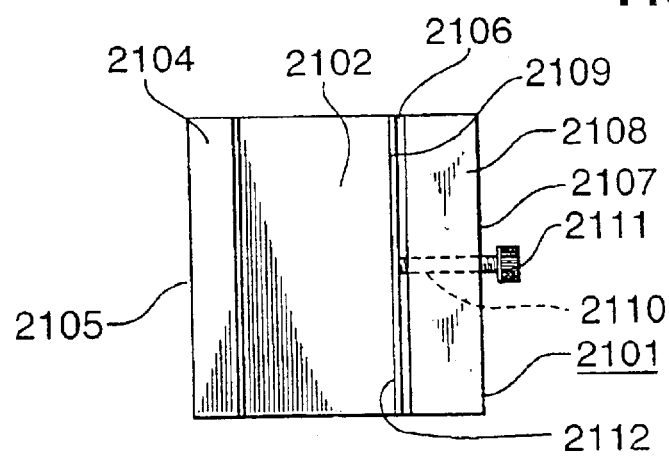
FIG. 20

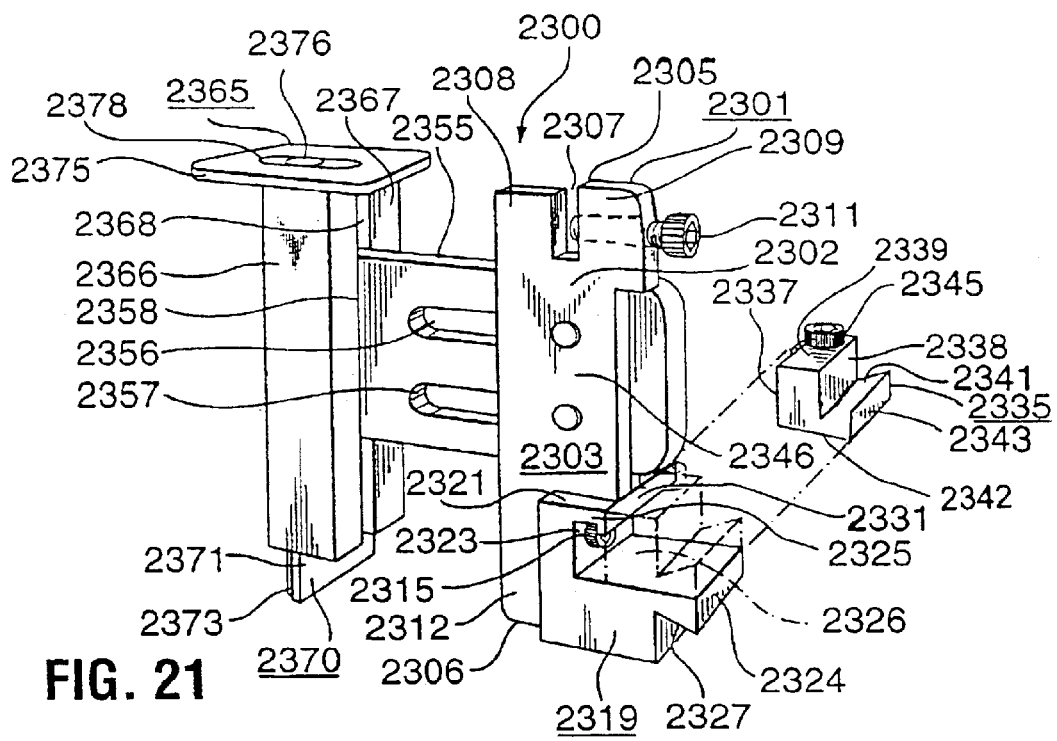
FIG. 21
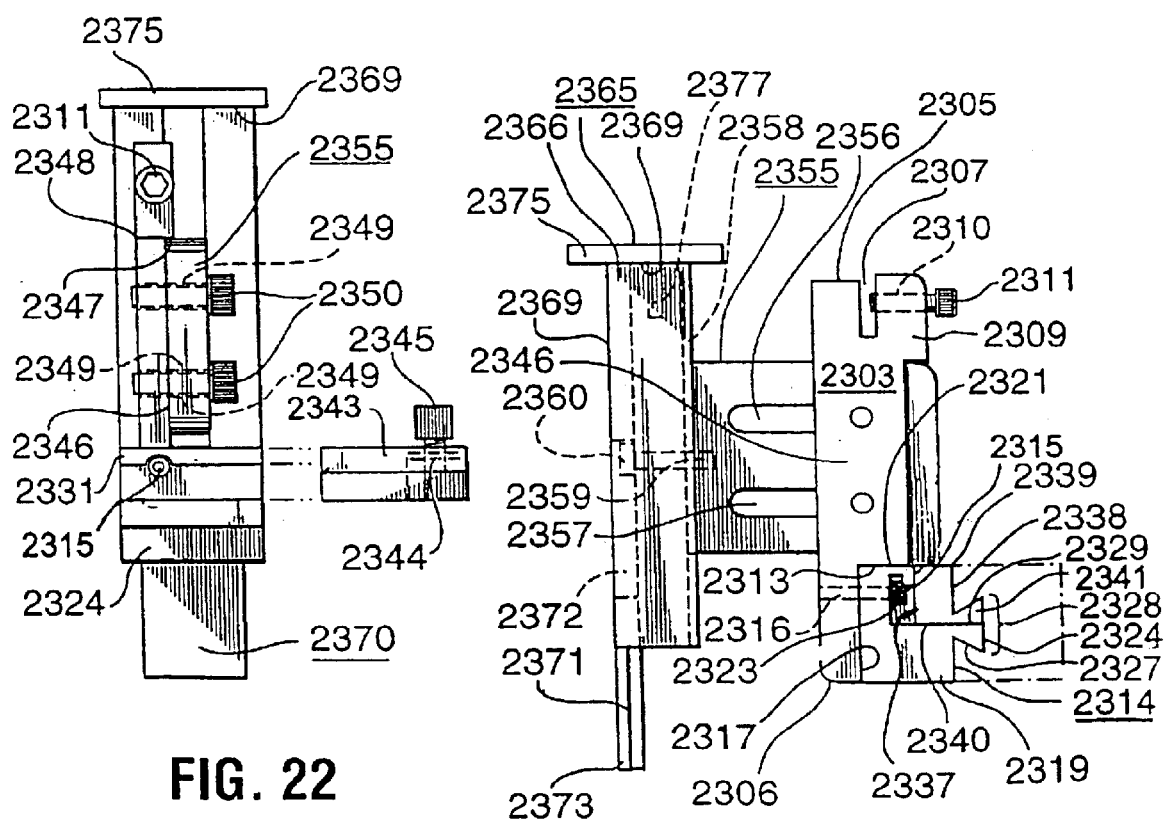
FIG. 22
FIG. 23

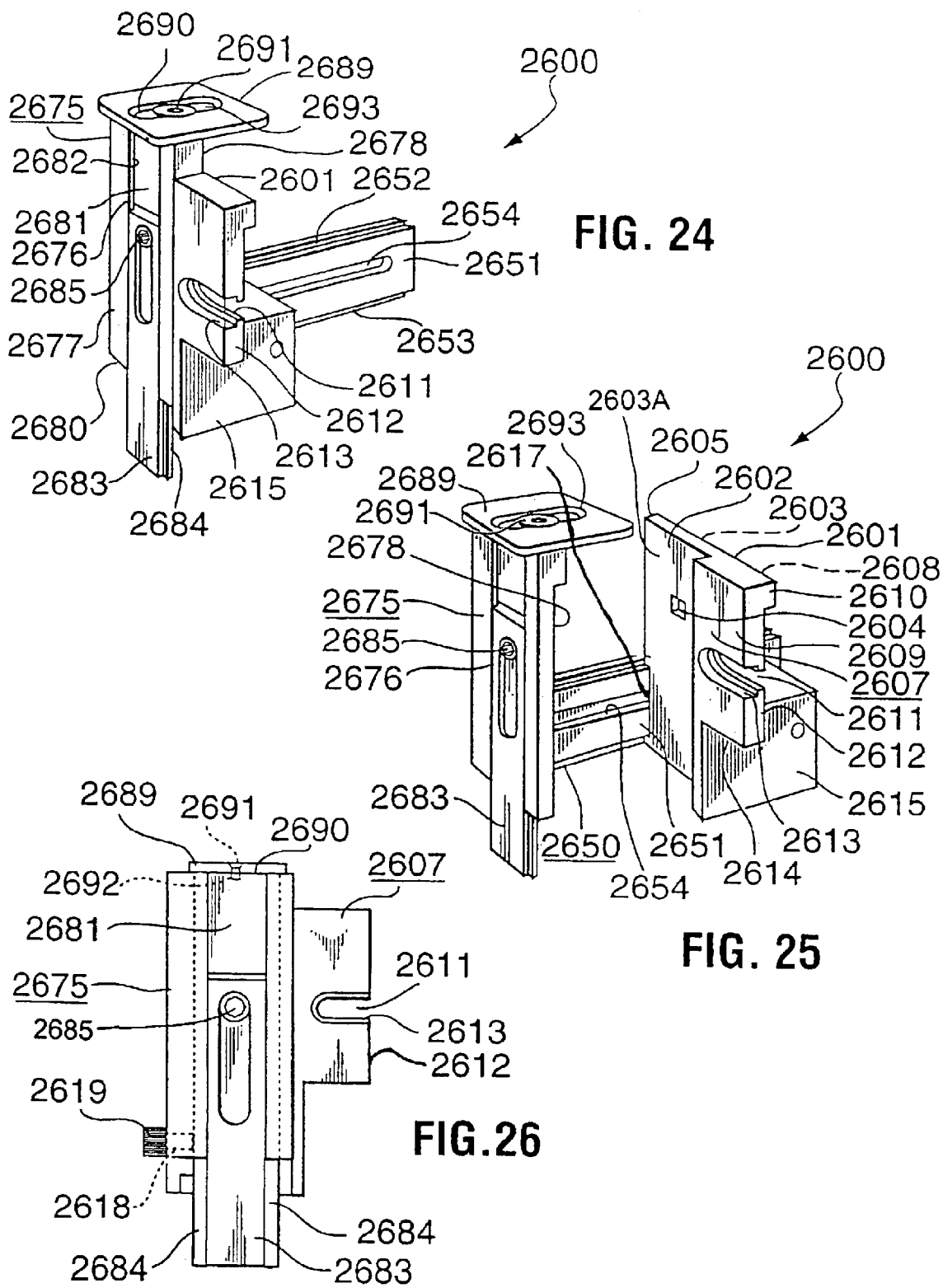

ELEMENTS TO ERECT FEMALE AND MALE BLANKING DIES FOR A DIE CUTTING AND/OR BLANKING MACHINE

TECHNICAL FIELD TO WHICH THE INVENTION RELATES

The present invention relates generally to an improvement in apparatus for the automatic die cutting of blanks primarily for making formable paperboard containers. In particular, it relates to improvements in elements by means of which the male blanking die and the female blanking die for the automatic die cutting of the blanks may be erected.

This application claims priority of co-pending Canadian Patent Application No. 2,259,785, filed Jan. 19, 1999, the entire contents of which are incorporated herein.

BACKGROUND ART

With the advent of many different sizes, shapes and configurations of containers, it is well-known in the art to die-cut, strip and blank box blanks using an automatic sequential press or die cutting machine. By automating the process and by using computer-aided technology, it is now possible to configure die-cut blanks in a limitless number of dimensions and specifications and, as well, to lay-out any number of blanks on a single sheet of material while automatically cutting, stripping and blanking the sheets with little or no human operator intervention. One typical system and press known in the art is discussed in U.S. Pat. No. 5,337,639, issued Aug. 16, 1994 and assigned to Die-X Tooling Systems.

As described in that U.S. Pat. No. 5,337,639, computer technology, combined with attendant laser technology, has enabled box manufacturers to utilize highly-accurate cutting and creasing dies for producing a planar sheet of die-cut blanks, and also to produce male and female blanking dies used automatically to separate the die-cut or stamped forms from the intervening web or waste portion of the sheet. Automatic blanking, in particular, resulted in a tremendous cost savings compared to the identical operation when performed by labourers using manual blanking means.

The known prior art, constituted by the current technology, includes automatic systems or presses that fed large sheets of material for cutting and scoring of blanks, and also, for automatically-stripping the excess material from the stamped sheet, thereby leaving a flexible thin webbing supporting the various rows of stamped carton forms. The known prior art also contemplated the use of a male and female combination blanking die for automatically-separating the planar forms from the flexible web. The male die, effective through the use of a blanking member, pushed each of the cartons which were blanked through the web and through the apertures in the supporting female die. The thin web typically-remained on the face of the female die while the separated blanks were pushed through the blanking holes into a stack below the female blanking die.

For speed and efficiency, the prior art also contemplated the use of a travelling feed bar and grippers to "pull" a sheet through the various stations of the machine on a continuous chain drive or other mechanism, thereby automatically-feeding the sheet from station to station. Similarly, in most applications, the remaining flexible web on the face of the female die after blanking was also pulled away through the use of the travelling bar and grippers into a waste container or other receptacle at the end of the machine.

The general configuration of automatic die cutting machines for the production of such die-cut blanks is well-known. A sheet of blank material was automatically-interposed, or urged by mechanical means, beneath the surface of a cutting die as part of the first stage of the operation. The cutting die comprised a planar die having specially-configured cutting edges which were created through the use of computer and laser technology, to reflect a particular series of die-cut blank lay-outs for cutting. Once a sheet was interposed under the cutting die on a cutting platten, the cutting die was pressed onto the sheet from below, thereby causing the sheet to be "cut" or "scored" by the cutting die thereabove.

While not essential for a thorough understanding of the present invention, a typical system and press known in the art for automatic die cutting and blanking, which is taught in that U.S. Pat. No. 5,337,639, will now be briefly-described.

The press generally-comprised means for feeding a series of blank, planar sheets into the press or system, e.g., by the use of a travelling bar and appended pulling grippers and then to a scoring and/or cutting station. Thereafter, at the scoring or stamping station, a plurality of rows and columns of die-cut forms were stamped or scored on to the sheet. The sheet, which remained in one piece, was next pulled automatically to a stripping station where much of the small pieces of the excess material around the die-cut forms were automatically-removed. What remained was a series of stamped and creased die-cut forms, which were held together by a thin web therebetween. The thin web and attached die-cut blanks were then automatically-pulled into a blanking station, where the die-cut blanks were completely-separated from the web and were then dropped onto a pallet for transfer.

The blanking station specifically-included the use of a male blanking die/female blanking die combination which, when engaged, pressed and separated the box blanks from the web and onto the pallet. The remaining thin web lay on the face of the female die component and was ready for disposal, in a disposal area at the end of the press. As a result of the blanking operation, a planar blank was produced and was in a condition for assembly, by automatic folding or otherwise, for the insertion of merchandise, food stuffs or other products to be contained therein.

That male blanking die/female blanking die combination included a female blanking die portion and a complementary male blanking die, for blanking or separating die-cut carton blanks or other forms into a detached web and a substantially-planar and unassembled die-cut blank. The die-cut sheet was automatically pulled through the press and over the female die portion, through the use of a travelling bar which had appended gripper fingers which were adapted to grip the leading edge of the die-cut sheet.

After blanking, the web remained on the face of the female die portion and included a series of intermediate web portions which, together, formed an extremely-flexible and "flimsy" "skeleton", which had to be removed from the female blanking die face. In actual operation, the travelling bar and appended grippers pulled the flexible web over the female blanking die face, including the leading edges of the female blanking die.

In the operation of the blanking dies, the male blanking die was pressed downward through the corresponding through holes in the female blanking die, thereby separating and pushing the blanked carton through the through holes, resulting in die-cut blanks and leaving a web on the surface of the female blanking die. At this point, it was then necessary automatically to remove the remaining web portion from the face of the female blanking die, by use of the travelling bar and grippers.

After the initial cutting process, the entire cut sheet or scored sheet was automatically pulled or urged into a second (or "stripping") station, for the operation for the stripping-away of most of the excess material from around the cut box blanks. The stripping operation comprised the use of a female stripping tool onto which the cut sheet was automatically-interposed. The female stripping tool had a series of configured openings which corresponded to the cut portions of the cut sheet, and was adapted to receive the male stripping tool from above. The male stripping tool cooperated with the female stripping tool and effectively broke-away and separated the majority of excess material from the box blanks, by being urged downwardly onto the sheet which was arranged over the female stripping tool. It was, of course, critical that the male and female stripping tools be aligned precisely and that the cut sheet be arranged in alignment therebetween, to insure that stripping was effectively-accomplished, i.e., without tearing of the box flank, jamming of the machine or damage thereto. Further, precise alignment was required due to the narrow tolerances which were necessary to assemble the box or container, which was formed from the cut sheet.

On machines so-configured, the stripped sheet was next urged in between yet another series of male and female blanking tools, which were arranged one above the other and which were also required to be in precise alignment. The female blanking tool was adapted to receive thereabove the die-cut blank, which was stripped at the previous station and which had a series of openings directly-corresponding to the shapes of the cut boxes to be blanked. In turn, the corresponding male blanking tool of similar contour to that of the female tool, was adapted to push the cut box blanks free from any remaining extraneous material and through the female blanking tool into a stack therebelow. Accordingly, it was once again required that the male and female blanking tools be carefully aligned and that the sheet to be blanked be precisely arranged therebetween, to avoid problems similar to those described in the stripping portion of the operation. After blanking was completed, the remaining extraneous material was then urged-off the face of the female blanking tool, into a refuse area and the process continues from the beginning.

It was well-known and was recognized in the prior art, that the set-up of the blank cutting machine was critical to efficient and proper automatic cutting, stripping, and blanking of multiple box blanks. The alignment method currently-practised in the art was a manual one, i.e., one which relied upon the senses and the vision of the operator manually to adjust the stripping and blanking tools, through use of the applicable alignment means of a particular machine press. Accordingly, it was not unusual for machine set-up to take anywhere from four to six hours, especially for complex box layouts comprising various series of boxes and orientations. Due to the precision required and to the high tolerances of the components, the method of manually-setting-up the machine required that the machine be "down" for extended periods of time between production runs. This, of course, resulted in diminished-capacity and in diminished-productivity, and thus, affected the overall cost of the production and the price of the box blanks.

Applicant's co-pending Canadian Patent Application Serial No. 2,259,785, filed Jan. 19, 1999, the contents of which are incorporated herein, provided an improvement in a female blanking die for a die cutting machine for die cutting and/or blanking a carton blank, as well as a combination male blanking die/female blanking die, and methods of producing them and elements constituting essential integers thereof are provided herein. The male blanking die/female blanking die combination included a male stripping die which included a template having a particularly-specified perimeter, the template including a plurality of foam plastic pads which were removably-secured to the undersurface of the template. The template was accurately-secured at a predetermined position to the underface of a movable upper plate of the blanking station of the die cutting machine. The male blanking die/female blanking die combination also included a female blanking die including a rectangular framework and a plurality of grid support members, each grid support member having a slot across its upper face, the grid support members being selectively-disposed along the internal perimeter of the rectangular framework. A grid was provided including a plurality of intersecting rails, the pattern of the intersecting rails having a predefined shape. The grid was disposed within the slots atop the grid support members. A plurality of jogger member members were provided which were selectively-disposed along the internal perimeter of the rectangular framework, each jogger member having a particularly-recited structure. The plurality of jogger member members were oriented along the internal perimeter of the rectangular framework in a particularly-recited way. The female blanking die was accurately-secured at a predetermined position atop a lower fixed plate of the blanking station of the die cutting machine. The male stripping die and the female blanking die were accurately-aligned to cooperate to press and to separate the carton blanks from a web holding them together, and to force the separated cartons through aligned openings in the female blanking die.

DESCRIPTION OF THE INVENTION

While the prior art was alleged to provide a solution to the problem of aligning the male blanking die with the female blanking die, with the die-cut carton blanks then being pushed through the female blanking die onto a stack of cartons below, in practice, such problem has not yet been satisfactorily-solved. Thus, there is still a need for accurately-aligning the male blanking die with the female blanking die, as well as guiding and supporting the blanked sheets in a fixed orientation, prior to the blanked cartons being discharged from the blanking machine to a pallet for transfer.

Accordingly, an object of one aspect of the present invention is to provide a set of novel elements by means of which the problem of accurately-aligning a male blanking die with a female blanking die in a die cutting machine may be successfully-solved.

An object of a second aspect of the present invention is to provide a set of novel elements for supporting and guiding a blanked sheet, which has had its side edges removed as it is automatically-urged to a blanking station.

An object of a third aspect of the present invention is to provide a set of novel elements by means of which a male blanking die and a female blanking die may be erected so that they are carefully-aligned, i.e., so that the cut carton blanks which are free from any remaining extraneous material, are then accurately-pushed-through openings in the female blanking die onto a stack of cartons therebelow.

An object of a fourth aspect of the present invention is to provide a set of novel elements to erect an improved female blanking die.

An object of a fifth aspect of the present invention is to provide a set of novel elements to erect an improved male blanking die.

An object of a sixth broad aspect of this invention is the provision of an improved system for holding the elements constituting essential integers to rails which constitute the rectangular framework.

An object of a seventh broad aspect of this invention is to provide novel jogger member members for the erection of female blanking dies.

An object of an eighth broad aspect of this invention is the provision of novel corner template brackets for the erection of female blanking dies.

An object of a ninth broad aspect of this invention is the provision of centre line clamps for the accurate-centering of a template in a universal press frame for the erection of female blanking dies.

An object of a tenth broad aspect of this invention is the provision of centre line orientation cylinders for the accurate centering of a template on a universal press frame for the erection of female blanking dies.

An object of an eleventh broad aspect of this invention is the provision of a grid support cylinder for the accurate placement of grids on a template, which has been centered on a universal press frame for the erection of female blanking dies.

An object of a twelfth broad aspect of this invention is the provision of novel legs supporting a universal press frame for the erection of female blanking dies.

By a first broad aspect of this invention, jogger members are provided for use in erecting a universal press frame for a female blanking die for die cutting machine for die cutting and/or blanking a carton blank, the universal press frame including a rectangular framework of connecting rails comprising two side rails, a front rail and a rear rail and a plurality of jogger members which are selectively-disposed within an internal groove in the rails and along the interior perimeter of the rectangular framework. Each jogger member includes a) a base member, b) means which are operatively-associated with the base member for selectively, but rigidly, securing the jogger member to the interior perimeter of the rectangular framework, c) an adjustable support member which is adjustably-slidably disposed with respect to the base member, and d) a guiding member having an upper edge and a lower edge, the guiding member being secured to one face of the adjustable support member to provide a depending guiding face.

By a first variant of this first broad aspect of this invention, the connecting rails are each provided with an internal groove having an upper depending longitudinally-extending flange and a lower upstanding longitudinally-extending flange, thereby defining the internal groove.

By a first variation thereof, the means b) comprises an inwardly-directed slot by means of which the jogger member may be adjustably-attached to the rails of the rectangular framework by means of screws or bolts. By a second variation thereof, the means b) comprises a transverse plate of a dimension enabling it to cooperate with the rails of the rectangular framework, the transverse plate including at least one tapped hole into which a bolt or screw may be threaded to engage the rail of the rectangular framework.

By a second variant of this first broad aspect of this invention, and/or the above variants and variations thereof, the jogger member includes slidable captive cap means having a leading edge, the slidable captive cap means being slidably-secured to the guiding member for selective disposition of its leading edge a predetermined cantilevered distance over the guiding face of the guiding member.

By a third variant of this first broad aspect of this invention, and/or the above variants and variations thereof, the base member is provided with an additional element which is secured to the base member, the additional element being slidable in a direction which is perpendicular to the guiding face of the guiding member.

By a first variation thereof, the additional element comprises a flat plate, and the base member is provided with a support arm which extends perpendicularly to the base member, the flat plate being selectively-slidably-retained along a longitudinal axis of the support arm. By a second variation thereof, the flat plate is provided with at least one longitudinally-extending slot, and the support arm is provided with means which are positioned within the longitudinally-extending slot, thereby to hold the flat plate in its selected position, following its slidable movement.

By a third variant of this first broad aspect of this invention, and/or the above variants and variations thereof, the additional element comprises an "L"-shaped support member which is slidably-secured to a lateral face of the base member, the "L"-shaped support member having a leg which is disposed parallel to the base member, and an arm which is disposed at right angles to the base member but which is selectively-slidable in a direction which is perpendicular to the guiding face of the guiding member, and wherein the guiding member is fixedly-secured to a face of the arm of the "L"-shaped support member.

By a first variation thereof, the guiding member is fixedly-secured to a face of the arm of the "L"-shaped support member, the additional element comprises a flat plate, the flat plate being provided with at least one longitudinally-extending slot, and the base member is provided with a support arm which extends perpendicularly to the base member, the flat plate being selectively-slidably-retained along a longitudinal axis of the support arm.

By a second variation thereof, the support arm is provided with means which are positioned within the longitudinally-extending slot, thereby to hold the flat plate in its selected position, following its slidable movement.

By a third variation thereof, the leg of the "L"-shaped support member includes a longitudinally-extending slot, the base member includes a block extending outwardly perpendicular thereto, and which has a flush face which is flush with the lateral face of the base member, the block being provided with means which are disposed in the slot to hold the leg in its selected position.

By a fourth variation thereof, the lateral face of the base member and the flush face of the block are each provided with a transversely-extending inset channel, and wherein the leg of the "L"-shaped support member is provided with a mating protrusion, the transversely-extending inset channel and the mating protrusion cooperating to provide a slideway for the leg with respect to the base member.

By a fourth variant of this first broad aspect of this invention, and/or the above variants and variations thereof, the guiding member includes a supplemental guiding finger having an upper end and a lower end, the supplemental guiding finger being slidably-associated with the guiding face of the guiding member, the supplemental guiding finger being slidable between a position in which its lower edge is flush with the lower end of the guiding member and a position where it extends below the lower edge of the guiding member.

By a first variation thereof, the supplemental guiding finger includes a longitudinally-extending slot, and the guiding member includes a set bolt which is secured to the guiding member and which projects into the longitudinally-extending slot to limit the extent of movement of the supplemental guiding finger within the longitudinally-extending slot.

By a second variation thereof, the guiding face of the guiding member includes a longitudinally-extending slot within which the supplemental guiding finger is guided to slide, and the supplemental guiding finger is provided with a pair of parallel lateral complementary flanges, whereby the longitudinally-extending slot and the pair of parallel lateral complementary flanges thereby cooperate to hold the supplemental guiding finger within the longitudinally-extending slot as well as to provide a slideway for the supplemental guiding finger with respect to the guiding member.

By a fifth variant of this first broad aspect of this invention, and/or the above variants and variations thereof, the slidable captive cap includes a longitudinally-extending slot, means are disposed in the slot and are secured to the upper edge of the guiding member to hold the cap to the guiding member as well as to secure the cap in its selected cantilevered position, and the guiding member includes a supplemental guiding finger having an upper end and a lower end, the supplemental guiding finger being slidably-associated with the guiding face of the guiding member, the supplemental guiding finger being slidable between a position in which its lower edge is flush with the lower end of the guiding member and a position where it extends below the lower edge of the guiding member.

By a sixth variant of this first broad aspect of this invention, and/or the above variants and variations thereof, the connecting rails are each provided with an internal dovetail groove which defines the internal groove.

By a first variation thereof, the means b) comprises a two-piece dovetail block, a first piece of the two-piece dovetail block being selectively-fixed to the base member and terminating in a portion of a dovetail projection, and a slidably-connectable connection by way of a cooperating, slidably-connectable second piece which terminates in the rest of the dovetail projection.

By a second variation thereof, the slidably-connectable connection is provided by a longitudinally-extending slot in the first piece and a transversely-spaced-apart, longitudinally-extending depending flange at an inner face of the first piece, and wherein the cooperating second piece includes a longitudinally-extending, upwardly-projecting flange at an outer, longitudinally-extending face of the second piece, the longitudinally-extending, upwardly-projecting flange being transversely-separated from a longitudinally-extending inner face of the second piece by a longitudinally-extending groove.

By a third variation thereof, the slidably-connectable connection is provided by a longitudinally-extending flange at an outer, longitudinally-extending face of the first piece, the longitudinally-extending flange being transversely-separated from a longitudinally-extending inner face of the first piece by a longitudinally-extending groove, and the second piece includes a longitudinally-extending slot, and a transversely-spaced-apart, longitudinally-extending depending flange at an inner face of the second piece.

By a seventh variant of this first broad aspect of this invention, and/or the above variants and variations thereof, the base member a) is provided with a primary additional element, the primary additional element being slidably-secured to the base member, so as to be slidable in a direction which is perpendicular to the guiding face of the guiding member.

By a first variation thereof, the primary additional element is provided with at least one longitudinally-extending slot, the primary additional element being selectively-slidably-retained along a transverse axis of the base member, the base member being provided with means which is positioned within each the at least one longitudinally-extending slot, thereby to hold the primary additional element in its selected position, following its slidable movement, the primary additional element being secured to the guiding member.

By an eighth variant of this first broad aspect of this invention, and/or the above variants and variations thereof, the guiding member includes a supplemental guiding finger having an upper end and a lower end, the supplemental guiding finger being slidably-associated with the guiding face of the guiding member, the supplemental guiding finger being slidable between a position in which its lower edge is flush with the lower end of the guiding member and a position where it extends below the lower edge of the guiding member.

By a first variation thereof, the supplemental guiding finger includes a longitudinally-extending slot, and the guiding member includes means which are secured to the guiding member and which projects into the longitudinally-extending slot of the guiding finger to limit the extent of movement of the supplemental guiding finger within the longitudinally-extending slot.

By a second variation thereof, the guiding face of the guiding member includes a longitudinally-extending slot within which the supplemental guiding finger is guided to slide, and the supplemental guiding finger is provided with a pair of parallel lateral complementary flanges, whereby the longitudinally-extending slot and the pair of parallel lateral complementary flanges thereby cooperate to hold the supplemental guiding finger within the longitudinally-extending slot as well as cooperating to provide a slideway for the supplemental guiding finger with respect to the guiding member.

By a ninth variant of this first broad aspect of this invention, and/or the above variants and variations thereof, the jogger member includes two slidably-interconnected main pieces, a first main piece comprising a lower block including a first upcomer projecting upwardly at right angles thereto, the upcomer including a first inner longitudinally-extending arm, and a second, outer, transversely-extending arm, a second main piece including a transversely-extending leg, the leg having a longitudinally-extending closed-ended slot therein, and means cooperating with the slot and the block of the first main piece to enable sliding of the transversely-extending leg with respect to the block and to hold the transversely-extending leg in a selected position with respect to the block, and a second upcomer projecting upwardly at right angles thereto the second upcomer including a first inner longitudinally-extending arm of a width which is equal to the width of the first inner longitudinally-extending arm of the first main piece, and an inner longitudinally-extending second flange projecting inwardly from the first inner longitudinally-extending arm, and having its lower end at a level higher than the height of the first inner longitudinally-extending arm of the first upcomer, the outer face of the first inner longitudinally-extending arm of the second upcomer comprising the guiding member.

By a tenth variant of this first broad aspect of this invention, and/or the above variants and variations thereof, the jogger member includes two slidably-interconnected main pieces, a first main piece comprising a lower block including a first upcomer projecting upwardly at right angles thereto, the first upcomer including a first inner longitudinally-extending arm, and a second, outer, transversely-extending arm, a second main piece including a transversely-extending leg, the leg having a longitudinally-extending closed-ended slot therein, and means cooperating with the slot and the block of the first main piece to enable sliding of the transversely-extending leg with respect to the block and to hold the transversely-extending leg in a selected position with respect to the block, and a second upcomer projecting upwardly at right angles thereto, the second upcomer including a first inner longitudinally-extending arm of a width which is equal to the width of the first inner longitudinally-extending arm of the first main piece, and an inner longitudinally-extending first flange projecting inwardly from the first inner longitudinally-extending arm, and having its lower end at a level higher than the height of the first inner longitudinally-extending arm of the first upcomer, the outer face of the first inner longitudinally-extending arm of the second upcomer comprising the guiding member.

By a first variation of these ninth and tenth variants, the block of the first main member includes an inner groove which is provided by a spaced-apart upper projecting first flange and a lower projecting second flange, the transversely-extending leg of the second main member includes an outer third flange which is provided by a spaced-apart upper groove and a lower groove, and the block includes a tapped aperture, and the slot of the transversely-extending leg is provided with a screw projecting therethrough and cooperating with the tapped aperture of the block.

By a second variation thereof, the first inner longitudinally-extending arm of the first main piece includes an aperture therethrough, which cooperates with an aligned projection on the inner face of the first inner longitudinally-extending arm of the second main piece.

By a third variation thereof, the second outer transversely-extending arm includes a transversely-extending groove extending inwardly from an outer side face thereof.

By an eleventh variant of this first broad aspect of this invention, and/or the above variants and variations thereof, the jogger member includes e) slidable captive cap means having a leading edge, the slidable captive cap means being slidably-secured to the guiding member d) for selective disposition of its leading edge a predetermined cantilevered distance over the guiding face of the guiding member.

By a first variation thereof, the slidable captive cap includes a longitudinally-extending slot, and includes means which are disposed in the slot and which are threadedly-secured to the upper edge of the guiding member to hold the slidable captive cap in its selected cantilevered position.

By a second variation thereof, the slidable captive cap means includes a longitudinally-extending slot, and includes means which are disposed in the slot and which are secured to the upper edge of the guiding member to hold the slidable captive cap to the guiding member as well as to secure the slidable captive cap in its selected cantilevered position.

By a second broad aspect of this invention, support legs are provided for use in erecting a universal press frame for a die cutting machine for die cutting and/or blanking a carton blank, the universal press frame including a rectangular framework of connecting rails comprising two side rails a front rail and a rear rail, and a plurality of support legs supporting the universal press frame. Each support leg includes a) a main base block, b) a longitudinally-extending, rectangular channel extending downwardly from an upper face of the main base block, c) a longitudinally-extending slot which is transversely-spaced-apart a short distance away from the longitudinally-extending channel, and extending downwardly from the upper face of the main base block, and d) a springingly-movable wall sited between the longitudinally-extending channel and the slot, the width of the longitudinally-extending channel and the rails being so-selected that the rail is held onto the longitudinally-extending channel by an interference fit.

By a first variant of this second broad aspect of this invention, the support leg includes means for resiliently-urging the springingly-movable wall towards the longitudinally-extending channel, thereby to reduce the width of the longitudinally-extending channel and to lock the rail within the longitudinally-extending channel.

By a first variation thereof, the means comprises a bolt or a screw which is disposed within a tapped hole in a side wall of the main base block adjacent to the slot, the bolt or screw being adapted to be urged into compressive-contact with the springingly-movable wall.

By a third broad aspect of this invention, template corner locking clamps are provided for use in erecting a universal press frame for a die cutting machine for die cutting and/or blanking a carton blank, the universal press frame including a rectangular framework of connecting rails comprising two side rails a front rail and a rear rail the rails including an interior groove therein, and a plurality of template corner locking clamps. Each template corner locking clamp includes a) a longitudinally-extending base member, b) means which are operatively-associated with the base member for selectively, but rigidly, securing the template corner locking clamps to the perimeter of the rectangular framework at a respective side rail adjacent to each of the front rail and the rear rail, and c) a transversely-extending arm projecting at right angles from the top of the longitudinally-extending base member, the transversely-extending arm including a closed-ended, longitudinally-extending slot adjacent to its leading edge.

By a first variant of this third broad aspect of this invention, the template corner locking clamp includes an upper "L"-shaped member having an upper longitudinal arm and an upper depending leg, the upper "L"-shaped member being operatively-secured to a longitudinally-extending arm of a lower "L"-shaped member which also includes a lower depending leg.

By a second variant of this third broad aspect of this invention, the template corner locking clamp includes an upper "L"-shaped member, the upper "L"-shaped member including a longitudinally-extending arm which includes a closed-ended slot near its outer end to provide the means c).

By a first variation thereof, the space between the upper depending leg of the upper "L"-shaped member and the lower depending leg of the lower "L"-shaped member is related to the width of the rails to provide an interference fit.

By a second variation thereof, the lower depending leg includes an upwardly-extending slot providing a springingly-movable wall, and manually-actuable means for urging the springingly-movable wall into tight frictional engagement with the rail.

By a third variation thereof, the manually-actuable means comprises a bolt which is threaded into an integrally-threaded transverse aperture in the lower depending leg, the end of the bolt abutting the springingly-movable wall.

By a fourth broad aspect of this invention, centre line brackets are provided for use in erecting a universal press frame for a die cutting machine for die cutting and/or blanking a carton blank, the universal press frame including a rectangular framework comprising four connected rails, and a pair of centre line brackets for securement to the centre point of a front rail and a rear rail of the four connected rails. Each centre line bracket includes a) a generally-rectangular parallelepiped upper base block, the generally-rectangular parallelepiped upper base block including a transversely-extending cradle, preferably a semi-cylindrical cradle groove extending downwardly from a top face thereof, b) a depending leg of the same width as the base member block, but of lesser thickness, and c) means which are operatively-associated with the base member block and the depending leg for selectively, but rigidly, securing a centre line bracket to the interior of the rectangular framework at the centre point of a respective the front rail and of the rear rail.

By a first variant of this fourth broad aspect of this invention, the front rail and the rear rails are each provided with an internal dovetail groove, and also are provided with an upstanding flange adjacent to its inner face.

By a second variant of this fourth broad aspect of this invention, and/or the above variants and variations thereof, the means c) comprises an upwardly-extending slot on the depending leg, the upwardly-extending slot engaging the head of a bolt whose threaded end is threaded into an internally-threaded trapezoidal nut which is slidingly-disposed within the internal dovetail groove.

By a first variation thereof, the upwardly-extending slot includes a countersunk similar upwardly-extending slot of a greater size.

By a second variation thereof, the centre line bracket also includes a groove which is defined by an overhanging, downwardly-projecting flange, the groove being adapted to accommodate the upstanding flange on the rails.

By a fifth broad aspect of this invention, auxiliary adjustable support members are provided for use in erecting a universal press frame for a female blanking die for die cutting machine for die cutting and/or blanking a carton blank, the universal press frame including a rectangular framework comprising two side rails, a front rail and a rear rail and a plurality of jogger members which are selectively-disposed along the interior perimeter of the rectangular framework. Each auxiliary adjustable support member includes a base member, securement means which are operatively-associated with the base member for selectively, but rigidly, securing the auxiliary adjustable support member to the interior perimeter of the rectangular framework, and an adjustable auxiliary captive supporting table having a leading edge, the adjustable auxiliary captive supporting table being slidably-adjustably-disposed with respect to the base member.

By a first variant of this fifth broad aspect of this invention, the connecting rails are each provided with an internal dovetail groove.

By a first variation thereof, the securement means comprises a transverse plate of a dimension enabling it to cooperate with the rails of the rectangular framework, the transverse plate including a pair of upwardly-extending slots into which a bolt or a screw may be engaged, the bolt or screw being threaded into an internally-threaded trapezoidal nut which is slidably-disposed within the internal dovetail groove of the rail of the rectangular framework.

By a second variant of this fifth broad aspect of this invention, and/or the above variants and variations thereof, the auxiliary adjustable support member includes an integral longitudinally-extending plate which is disposed atop of the base member and overhangs the front edge thereof, and is provided with an internally-threaded aperture to enable engagement with the adjustable auxiliary captive supporting table which is disposed atop of the base member and overhangs the front edge thereof, the integral longitudinally-extending plate being threaded into the hole.

By a third variant of this fifth broad aspect of this invention, and/or the above variants and variations thereof, the adjustable auxiliary captive supporting table comprises a captive longitudinally-slidable table which is transversely-disposed atop the integral longitudinally-extending plate, the captive longitudinally-slidable supporting table having a longitudinally-extending, double closed-ended slot, and cooperating upper and lower complementary grooves, and the lower groove being adapted frictionally to engage the upper edge of the integral longitudinally-extending plate.

By a sixth broad aspect of this invention, grid support and orientation brackets are provided for use in erecting a universal press frame for a female blanking die for a die cutting machine for die cutting and/or blanking a carton blank, the universal press frame including a rectangular framework comprising two side rails, a front rail and a rear rail, and a grid supported by the rectangular framework, the grid comprising a plurality of intersecting rails, the pattern of the intersecting rails coinciding with the shape of abutting portions of a plurality of cartons which are contained on a sheet which has been die-cut by a male cutting die of a die cutting machine. Each grid support and orientation bracket includes a generally-step-shaped block, the step-shaped block including an upper vertical arm and an off-set lower vertical leg, which are joined by a horizontal deck, a vertical slot extending from an upper edge of the upper vertical arm means associated with the upper arm for securing an additional distinct element within such vertical slot, and securing means which are operatively-associated with the legs for selectively, but rigidly, securing the grid support and orientation bracket to the interior perimeter of the rectangular framework, the grid support being disposed within the slots atop the grid support and orientation brackets.

By a first variant of this sixth broad aspect of this invention, the connecting rails are each provided with an internal dovetail groove.

By a second variant of this sixth broad aspect of this invention, and/or the above variants and variations thereof, the securing means comprises a bolt, the head of which is engaged within the vertical slot, the threaded end of which is threaded into an internally-threaded trapezoidal nut which is slidably-fitted within the dovetail groove.

By a seventh broad aspect of this invention, a plurality of centre line orientation cylinders are provided for use in erecting a universal press frame for a die cutting machine for die cutting and/or blanking a carton blank, the universal press frame including a rectangular framework comprising four connected rails, and a template having a perimeter that is substantially-identical to the outer perimetrical shape of a sheet containing a plurality of carton blanks which have been die-cut by a male cutting die of the die cutting machine. The plurality of centre line orientation cylinders are adapted to align the template at the centre of the rectangular framework. Each centre line orientation cylinder is insertable in the template along the centre line thereof and includes a) an upper upright barrel, b) a bore extending through the upper upright barrel adjacent to the upper end thereof, c) a plurality of threads at the base of the upper upright barrel, d) a disc-like collar threadedly-engaged with the plurality of threads at the base of the upper upright barrel, and e) a depending cylindrical base of a lesser diameter than the diameter of the upper upright barrel, the depending cylindrical base being provided with a plurality of threads at the base thereof.

By a first variant of this seventh broad aspect of this invention, the collar includes a plurality of circumferentially-spaced-apart nicks therein.

By a second variant of this seventh broad aspect of this invention, and/or the above variants and variations thereof, the centre line orientation cylinder is provided as a pair of centre line orientation cylinders, and in combination with a rod extending through aligned bores, which extend transversely through the upper barrel, the pair of centre line orientation cylinders being secured to the template by means of a depending integral lower threaded end which is threaded into a "T"-nut which is secured within the template and which is held thereto by a threaded bolt washer.

By an eighth broad aspect of this invention, a plurality of grid orientation cylinders are provided for use in erecting a universal press frame for a die cutting machine for die cutting and/or blanking a carton blank, the universal press frame including a rectangular framework comprising four connected rails, and a template having a perimeter that is substantially-identical to the outer perimetrical shape of a sheet containing a plurality of carton blanks which have been die-cut by a male cutting die of the die cutting machine. The plurality of grid orientation cylinders are adapted to align the template at the centre of the rectangular framework. Each grid orientation cylinder is insertable in the template along the centre line thereof and includes a) an upper upright barrel, b) at least one slot extending through the upper upright barrel adjacent to the upper end thereof, c) a plurality of threads at the base of the upper upright barrel, d) a disc-like collar threadedly-engaged with the plurality of threads at the base of the upper upright barrel, and e) a depending cylindrical base of a lesser diameter than the diameter of the upper upright barrel, the depending cylindrical base being provided with a plurality of threads at the base thereof.

By a first variant of this eighth broad aspect of this invention, the grid orientation cylinder includes two slots (b) at right angles to one another, each slot being of different widths.

By a second variant of this eighth broad aspect of this invention, and/or the above variants and variations thereof, the collar includes a plurality of circumferentially-spaced-apart nicks therein.

By a third variant of this eighth broad aspect of this invention, and/or the above variants and variations thereof, the grid orientation cylinder is provided as a plurality of grid orientation cylinders, and in combination with the template, the grid orientation cylinders being secured to the template by means of a depending integral lower threaded end may be threaded into a "T"-nut which is secured within a template which is associated with the female blanking die and which is held thereto by a threaded bolt washer.

By a ninth broad aspect of this invention a rail connecting element is provided for connecting two mutually-transverse rails together at right angles to one another, each rail including a dovetail groove therein, the rail connecting element comprising an inverted, "L"-shaped rectangular parallelepiped block, the inverted, "L"-shaped rectangular parallelepiped block including a) a through hole extending from one side face to the opposite side face, b) a through hole extending from an end face to the opposite end face, the two through holes being longitudinally-offset from one another, whereby a bolt extending through the through hole a) engages a trapezoidal nut which is disposed in the dovetail groove in one rail, and tightening of the bolt secures the rail to the rail connecting element, and whereby a bolt extending through hole b) engages a trapezoidal nut which is disposed in the dovetail groove in the other rail, and tightening of the bolt secures the other rail to the same rail connecting element.

By one variant of this ninth broad aspect of this invention, the through hole a) is spaced-apart longitudinally-higher than through hole b).

By a second variant of this ninth broad aspect of this invention, the four rail connecting elements are provided, in combination, with four mutually-transverse rails, each rail connecting element being secured to two mutually-transverse rails to provide a rectangular universal press frame of two side rails, a front rail and a rear rail, in which the two side rails are at a lower level than the front rail and the rear rail.

As generally-described above, the improved elements of aspects of this invention, namely the mounting system, the jogger members, the template corner locking clamps, the centre line clamps, the centre line orientation cylinders, the grid orientation brackets, the grid orientation cylinders, and the auxiliary support brackets, are used to erect a female blanking die in a universal press frame, which is a rectangular framework of two side rails, a rear rail and a front rail. While the female blanking die and the method for the erection thereof are not per se part of the present application, it will be described in narrative form to provide the background for this invention.

The so-erected female blanking die is in the form of a grid support frame which is accurately-positioned within the universal press frame. The female blanking die is accurately-positioned within the universal press frame by means of a template which has been laser-shaped, and which corresponds to the outer perimetrical shape of a sheet containing a plurality of cartons which are to be die-cut by the male cutting die of the die cutting machine. The perimetrical edges of the lasered template are used to define the extent to which the jogger member members project inwardly within the interior perimeter of the rectangular framework of the universal press frame. The perimetrical shape of the template and the rectangular apertures therethrough, are produced according to the instructions of a CAD program and then are laser cut. The outer perimeter of the template is $\frac{1}{32}$" outside of the carton cut lines which have been accurately-laser-etched into the template, according to the instructions of the CAD program. The inside laser-etched lines are on-size to match the outer perimetrical shape of the cartons to be die-cut by the die press. Etch lines are provided on the central line of the template, and laser-cut holes are provided along the central line. "T"-nuts are secured within the holes and centre line orientation cylinders, whose construction will be described hereinafter, are threaded into the "T"-nuts. The template is adjusted to be on the centre line of the universal press frame, by cooperation between the centre line orientation cylinders with a centre line rod and the two centre line brackets, and is adjusted longitudinally to datum positions which have been previously-designated according to the instructions of the CAD program, with respect to the front rail and the rear rail. Holes are also laser-cut in the template in precise locations according to the instructions of the CAD program. "T"-nuts are also secured within the holes and the grid orientation cylinders are threaded into the "T"-nuts. The construction of the grid orientation cylinders will be described hereinafter.

The grid orientation cylinders are used to fix the location of the female blanking die grid. The template is temporarily, but securely-fixed and accurately-fixed to the frame, by means of engagement with four template corner locking clamps (whose construction will be described hereinafter) which are disposed on the two opposed side rails of the universal press frame. This provides a rigid, stable combination of the universal press frame and the template.

The grid, in the shape of the outline of each of the abutting portions of the plurality of cartons to be die-cut, (and which forms the female blanking die) is placed atop the template to fit into the slots within the grid orientation cylinders, and into slots in the grid support brackets (whose construction will be described hereinafter) which are also disposed along the internal periphery of the universal press frame. The grid orientation cylinders include barrels which are rotated so that the grid fits onto the selected slots of the grid orientation cylinders. The grid orientation cylinders are locked into the template by means of lock washers. The ends of the grid are locked to respective grid support brackets by lock screws, and the grid support brackets are then slid along the universal press frame to the proper position according to the instructions of the CAD program as limited by the secured grid. The grid support brackets are then locked in accurate positions on the universal press frame, dependent on the accurate location of the grid. In this way, the grid is placed in the perfect position according to the instructions of the CAD program for accurate positioning of the female blanking die.

The jogger members (whose constructions will be described hereinafter) are now accurately-positioned around the upper perimeter of the universal press frame. Some or all of the jogger members may have been previously-placed around the inner perimeter of the universal press frame, before the template is secured therein. If not, all of the jogger members are placed at this time. In any event, all embodiments of the jogger members, which are selectively-disposed along the interior perimeter of the rectangular framework of the universal press frame, are adjusted so that their guiding faces abut selected perimetrical edges of the lasered template. In this way, the jogger members are thereby accurately-positioned.

If the back trim of the die-cut sheet containing the plurality of cartons has been removed by the stripper, the jogger member members are adjusted to abut the back of the lasered template. If the side trim has been removed from the die-cut and blanked sheet containing the plurality of cartons by the stripper, side rails are inserted into slots in the side jogger member members, or alternatively, in special side support brackets, and are secured therein with lock-down bolts. This provides support for the side edges of the blanked sheet.

The front end of the blanked sheet is associated with a gripper. The front trim is removed to provide the means to pull the blanked sheets through the press. The front trim support system comprises the front rail jogger members. The guiding edges of the front rail jogger members are adjusted to a perimeter which has been predetermined according to the instructions of the CAD program to the exact position. The guiding edges of the front rail jogger members are longitudinally-adjustable to set a distance which provides the shear for breaking the nicks in the blanked sheet.

By these means, the entire female blanking die, which includes the grid, is built-up. The template assures that the cut sheet is exactly-matched, and that the universal press frame is square. The female blanking die can be fixed in the press in registry with the datum, which is predetermined according to the instructions of the CAD program.

The die-cut sheet is supported on the grid (the female blanking die) and on the front trim support, and optionally, also on the side support rails. The jogger members are adjusted (i.e., fine-tuned), to position them to contact the perimeter of the template. The front trim support is adjusted (i.e., fine-tuned), by longitudinal movement to provide the proper set-up for the shear distance.

The template is then removed by the removal of the bolts holding the template to the template corner locking clamps. The template corner locking clamps are then removed, thereby allowing the template to drop down below the universal press frame. The distance of dropping is limited by the height of the supporting legs. Once the template is removed from underneath the universal press frame, the entire female blanking die and universal press frame is ready for mounting as the lower plate (female blanking die) of the blanking machine and is ready for production.

The template now becomes the male blanking die by the following steps. The grid orientation cylinders are removed from the upper surface of the template. The lower surface of the template is provided with a plurality of foam plastic blocks, which are removably-secured to the underside of the template. These blocks may be removably-secured by means of holding members, e.g., cylindrical members, "T"-shaped members, or "V"-shaped members, which are secured to the underside of the template. Some or all of these foam plastic blocks may be split longitudinally, so that the two portions may be slid along the holding members to "fine-tune" their position, as will be explained further hereinafter. The template is then secured, in the usual fashion, to the die cutting machine by means which are well-known in the art. Such securement is, however, very accurate and is in registry with the lower female blanking die, through the use of the holes from which the orientation cylinders have been removed. In use, the foam plastic blocks contact the blanked cartons in a manner which does not damage the cartons when the blanked-out cartons are removed from the die-cut sheets.

DESCRIPTION OF THE FIGURES

In the accompanying drawings,

FIGS. 4, 5 and 6, are views of one embodiment of the rail connecting element for securing the rails together to form the universal press frame, in which:

FIG. 4 is a perspective view of the rail connecting element;

FIG. 5 is a front elevational view thereof, and

FIG. 6 is a side elevational view thereof;

FIGS. 7 and 8, are views of one embodiment of a centre line orientation cylinder, in which:

FIG. 7 is a perspective view of a centre line orientation cylinder which is about to be inserted into a "T"-nut which is secured within an aperture in the template, and FIG. 8 is an elevational view thereof, partially in section;

FIGS. 9 to 13 are views of one embodiment of a centre line bracket, in which:

FIG. 9 is a perspective view of a centre line bracket,

FIG. 10 is a front elevational view thereof,

FIG. 11 is a rear elevational view thereof,

FIG. 12 is a side elevational view looking from the left of FIG. 9, and

FIG. 13 is a side elevational view looking from the right of FIG. 9;

FIGS. 14 to 18 are views of one embodiment of a template corner clamp, in which:

FIG. 14 is a perspective view of a template corner clamp,

FIG. 15 is a side elevational view thereof,

FIG. 16 is a bottom plan view thereof,

FIG. 17 is a top plan view thereof, and

FIG. 18 is an end view thereof looking from the left of FIG. 17;

FIGS. 19 and 20 are views of one embodiment of a leg, in which:

FIG. 19 is a perspective view of the leg, and

FIG. 20 is a top plan view thereof;

FIGS. 21 to 23 are views of one embodiment of a side rail jogger member and/or a rear rail jogger member, in which:

FIG. 21 is a partially-exploded perspective view of a jogger member,

FIG. 22 is a partially-exploded front elevational view thereof, and

FIG. 23 is a side elevational view thereof;

FIGS. 24 to 28 are views of one embodiment of a front rail jogger, in which:

FIG. 24 is a closed-perspective view thereof,

FIG. 25 is an open-perspective view thereof,

FIG. 26 is a front elevational view of the closed variant thereof,

FIG. 27 is a side elevational view of the open variant thereof, and

FIG. 28 is a rear elevational view of the closed variant thereof;

FIGS. 29 and 30 are views of another embodiment of a jogger member, in which:

FIG. 29 is a perspective view thereof, and

FIG. 30 is a rear elevational view thereof;

FIGS. 32 and 33 are views of one embodiment of an auxiliary support member, in which:

FIG. 32 is a perspective view thereof, and

FIG. 33 is a front elevational view thereof;

FIGS. 35 and 36 are views of one embodiment of a grid orientation cylinder, in which:

FIG. 35 is a perspective view of a grid orientation cylinder which is about to be inserted into a "T"-nut which is secured within an aperture in the template, and FIG. 36 is an elevational view thereof.

AT LEAST ONE MODE FOR CARRYING OUT THE INVENTION

While the erection of the female blanking die is not claimed in the present invention, it being the subject of co-pending U.S. patent application Ser. No. 09/692,320, a brief description thereof will be provided with respect to FIGS. 1 to 3.

Figure 1:
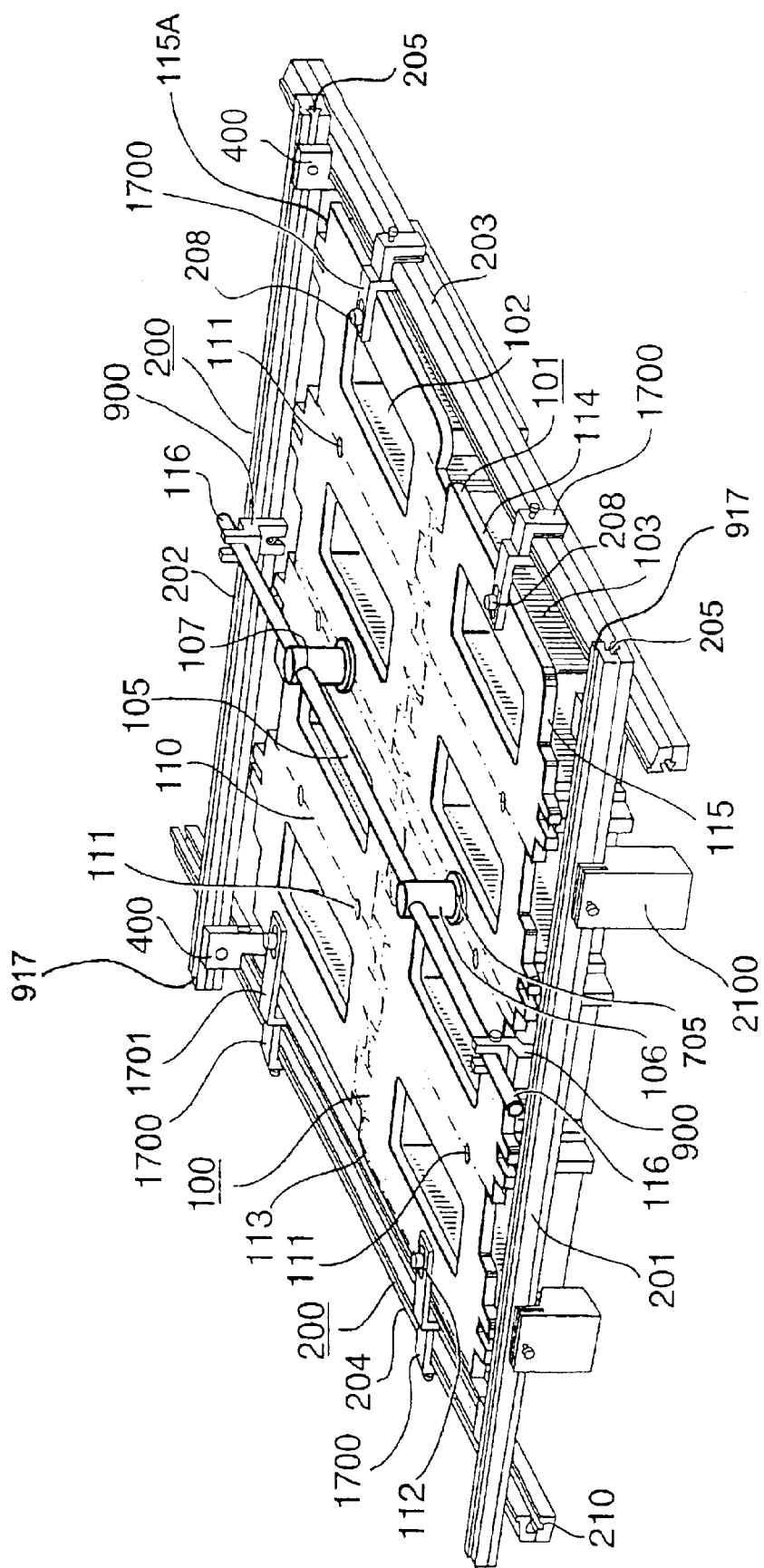
FIG. 1 is a perspective view of a universal press frame into which a template has been introduced and is fixed in its pre-selected position.

As seen in FIG. 1, a template 100 is provided within a universal press frame 200. The template 100 has a peripheral outline 101 which coincides with, but is slightly larger than, the periphery of a plurality of abutting cartons which haven been die cut from a sheet. The template 100 is also provided with a plurality of generally-rectangular holes 102, below which are a plurality of foam plastic blocks 103 which are removably-secured to the bottom surface thereof.

The template 100 is provided with a plurality of apertures within which are secured "T"-nuts. One series of such apertures are two centre line apertures. A centre line orientation cylinder 106, to be fully-disclosed hereinafter, is removably-secured in each of these "T"-nuts in these apertures. The through bores 107 in the centre line orientation cylinders 106 are aligned, and a centre line cylindrical rod 105 is urged therethrough.

The upper surface of the template 100 is provided with a lasered outline 110 which coincides with the inner abutted edges of the plurality of cartons which have been blanked from a sheet. A second set of apertures 111 is placed strategically along that lasered outline 110. These apertures are each also fitted with "T"-nuts.

A third set of such apertures 112 comprises four apertures, two of which are placed along each of the side edges 113,114 of the template 100, adjacent to the front edge 115 and to the rear edge 115A. This set of apertures 112 is also fitted with "T"-nuts.

The universal press frame 200 is constituted by a front rail 201, a rear rail 202, and two side rails 203,204. Each such rail is provided with a internal dovetail groove 205 (on the front and rear rail) and 210 (on the side rails). The side rails 203,204 are each secured at right angles to the front rail 201 and to the rear rail 202, by means of four rail-connector elements 400. The rail connector elements 400 are secured to rails by means of suitable bolts, which are threaded into trapezoidal nuts which are placed in the internal dovetail groove 205 or 210 in the rails. These rail connector elements 400 will be described in greater detail hereinafter.

Centre line clamps 900 have been placed on the front rail 201 and on the rear rail 202. These centre line clamps 900 have been secured at the precise centre point which has been marked on the front rail 201 and on the rear rail 202. These centre line clamps 900 will be described in greater detail hereinafter.

Legs 2100 have been secured onto the universal press frame 200, namely two on the front rail 201 and two on the rear rail 202. These legs 2100 will be described hereinafter.

Figure 14:
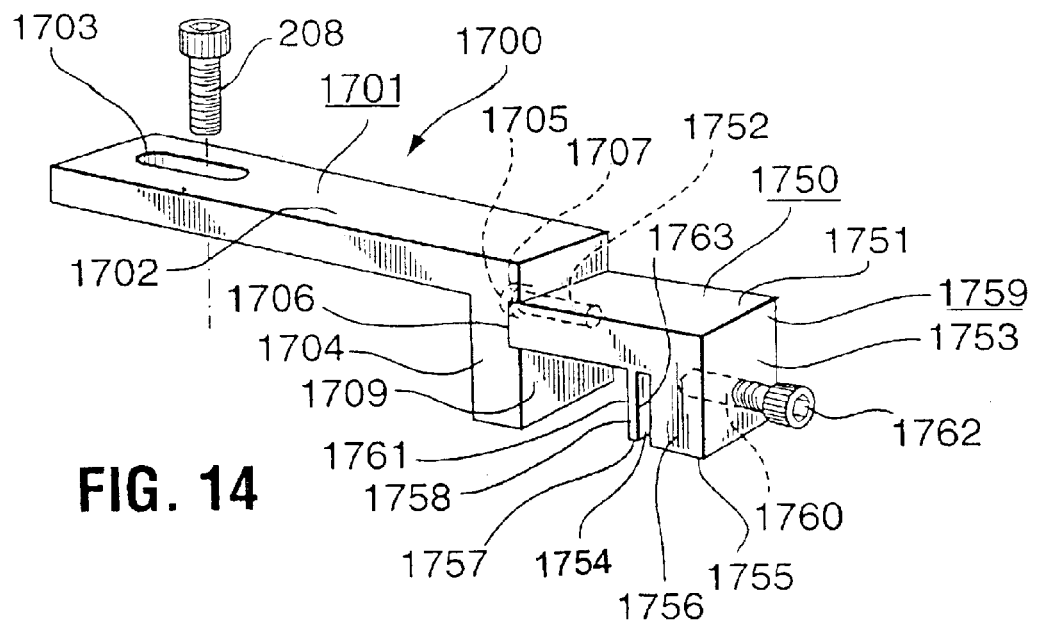

It is seen that the template has been placed within the universal press frame 200 by having the projecting ends 116 of the centre line cylindrical rod 105 rest on the cradles which are provided in the centre line clamps 900. The template 100 is, thus, placed exactly within the center of the universal press frame 200 in such a manner that it cannot be moved transversely, but it can be moved longitudinally. Four template corner clamps 1700 have been secured, two to each of the side rails 203,204, at the precise points on those rails which have been defined by a CAD program, to place the template 100 in the exact position for the erection of the female blanking die 300. These template corner clamps 1700 will be described hereinafter. The template 100 has been moved longitudinally so that the third set of apertures 112 in the template 100 are aligned with the slots in the template corner clamps 1700. Then, suitable bolts 208, e.g., Allen-head bolts, have been inserted through the slots in the template corner clamps 1700, to secure the template 100 in the exact position, as required by the CAD program, within the universal press frame 200. The intermediate structure so-provided is rigid, and is perfectly square and since the template 100 is perfectly sited within the universal press frame 200, it can be used as the basis for the erection of the female blanking die 300. Lock collar 705 is discussed in relation to FIGS. 7 and 8. Upper flange 917 is discussed with reference to FIGS. 9 to 13. Upper "L"-shaped component 1701 is discussed with reference to FIGS. 14 and 15.

Figure 2:
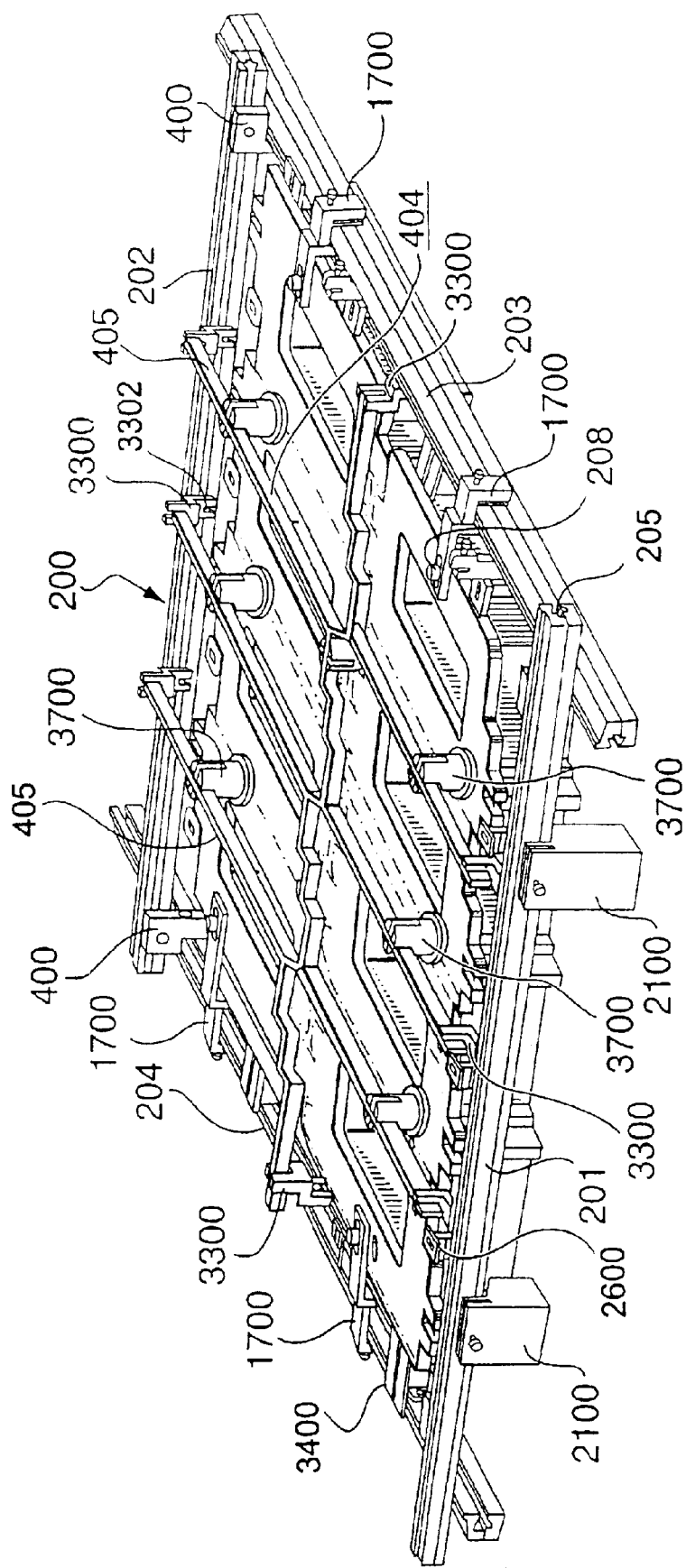
FIG. 2 is a perspective view of the universal press frame/template combination of FIG. 1, and in which all of the elements necessary to produce the female blanking die have been added.

As seen in FIG. 2, since the template 100 has been accurately-and rigidly-fixed within the universal press frame 200, the centre line clamps 900, the centre line cylindrical rod 105 and the centre line orientation cylinders 106 are no longer required. Consequently, the centre line cylindrical rod 105 is removed, the centre line orientation cylinders 106 are unscrewed from the "T"-nuts in the template 100, and the centre line clamps 900 have been removed from the rails 201,202.

A plurality of grid support brackets 3300 (which will be described hereinafter) have been placed loosely along the perimeter of the universal press frame 200. A plurality of grid orientation cylinders 3700 (which will be described hereinafter) have been placed in the second set of "T"-nut-fitted apertures 111. This enables a grid 404, which is shaped to coincide exactly with the inner abutted edges of the plurality of cartons which have been blanked from a sheet, to be placed with its grid rails 405 within the upper aligned grooves in the grid orientation cylinders 3700 and on the grid support brackets 3300. The grid support brackets 3300 have been slid along the respective rail to enable engagement with the grid rails 405 and are locked in that position on the respective rails. The grid has, thereby, been locked into place in the exact position, as defined by the CAD program, within the universal press frame 200. The lower vertical leg 3302 of the grid support bracket 3300 is discussed with reference to FIG. 31.

Figure 3:
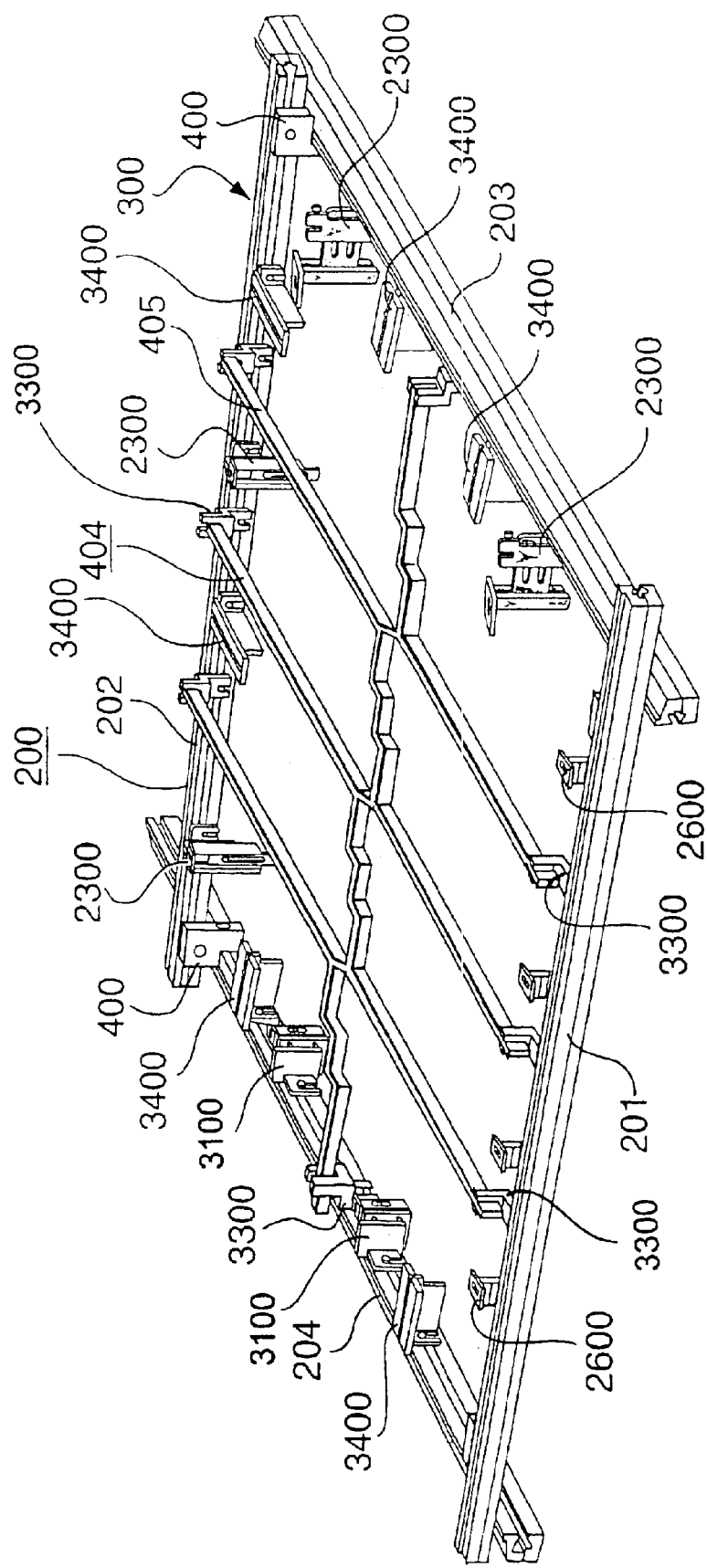
FIG. 3 is a perspective view of the female blanking die.

As seen in FIG. 3, a plurality of side rail jogger members and rear rail jogger members 2300 (which will be described hereinafter) have been secured at selected positions to the side rails 203,204 and rear rail 202. They have been adjusted so that the guiding surface abutted selected portions of the side and rear edges of the template 100, and so that the slidable caps thereof were slightly further into the central area of the universal press frame 200, than the guiding surfaces thereof.

A plurality of front rail jogger members 2600 (which will be described hereinafter) have been secured at selected positions to the front rail 201. They have been adjusted so that the guiding surface abutted selected portions of the front edge of the template 100, and so that the slidable caps thereof were slightly further into the central area of the universal press frame 200, than the guiding surfaces thereof.

A plurality of auxiliary support members 3400 (which will be described hereinafter with reference to FIG. 3) have been secured at selected positions to the rails 202,203,204. They have been adjusted so that the slidably-adjustable table thereof extended slightly further into the central area of the universal press frame 200, than the respective peripheral edges of the template 100. Front rail jogger members 2600 will be discussed with reference to FIG. 3.

FIG. 3 shows the finally-erected female blanking die 300. The suitable bolts 208 (as shown in FIGS. 1 and 2), e.g., Allen-head bolts, holding the template 100 to the template corner clamps 1700 have been removed, which allowed the template 100 to fall below the universal press frame 200 to the level which was defined by the bottom of the legs 2100. The centre line orientation cylinders 3700 have been removed from the template 100. In addition, the template corner clamps 1700 have been removed from the side rails 203,204.

This female blanking die 300, thus, comprises the universal press frame 200, to which are secured the grid support brackets 3300 which secure the grid 404 to the universal press frame 200. The universal press frame 200 is fitted with the plurality of side and rear rail jogger members 2300, the plurality of front rail jogger members 2600 and the plurality of auxiliary support members 3400. It is noted that the legs 2100 have been removed. Jogger member 3100 is discussed with reference to FIG. 29.

To recapitulate the above-detailed description in narrative form, a universal press frame is assembled as a rectangular framework of two side rails, a front rail and a rear rail. Each rail includes an internal dovetail groove. The side rails are preferably sited at a higher vertical level than the front rail and the rear rail.

The four template corner clamps are secured to the side rails, i.e., two on each side rail adjacent to the front rail and to the rear rail, situated on the side rails at particular data points which have been defined by a CAD program to dispose a template in the exact location within the universal press frame.

Then a centre line bracket is mounted on each of the front rail and of the rear rail, at the precise centre point of such rails.

A template, whose perimetrical shape coincides with the outer peripheries of a plurality of cartons which are to be blanked from a sheet, is however, slightly larger than those peripheries. The template is also provided with a centre line which is laser-etched thereon, and with a front centre line aperture and a rear centre line aperture on the lasered centre line. These centre line apertures are each fitted with a "T"-nut. The template is still further provided with a laser-etched pattern, which corresponds with the exact internal peripheries of the cartons which are to be blanked from a sheet. A plurality of grid orientation apertures are strategically-formed along the laser-etched pattern, and a "T"-nut is fitted into each of such grid orientation aperture.

A front and a rear centre line cylinder having an upper barrel which is provided with a circular through hole is secured to the front and to the rear centre line aperture, respectively. The circular through holes are lined-up and a cylindrical rod is passed therethrough. The template can then be picked up, using the cylindrical rod as a "handle" and can be placed within the universal press frame, resting on the four template corner lock clamps and with the ends of the cylindrical rod resting in the cradles which are defined by the upper ends of the centre line brackets. This prevents the template from transverse movement. However, the template can be moved longitudinally until position-designating apertures are aligned within the slots in the template corner locking clamps. A suitable screw is then inserted through the slots and onto the respective position-designating aperture. This locks the template in the "perfect" position within the universal press frame. Consequently, the cylindrical rod is removed, the centre line cylinders are removed, and the centre line brackets are removed.

Now, a plurality of grid orientation cylinders are secured within the grid orientation apertures. A plurality of grid orientation brackets is disposed along the periphery of the universal press frame. A grid, whose outline coincides with the abutting edges of the plurality of blanks to be blanked-out from a sheet, is placed within suitably-orientated slots in the grid orientation cylinders and in the grid orientation brackets. The ends of the grid, which are within the slots in the grid orientation brackets, are secured to their respective bracket. Then, the brackets, which were moved along the rail in order to have their slots accommodate the grid, are secured at those locations on the universal press frame.

Once this is done, the template is removed by disengaging the screws holding the template to the template corner clamps, and the suitable bolts holding the template corner clamps to the rails. This enables the template to be dropped down below the universal press frame. It is preferred that the universal press frame be provided with legs to limit the extent of the drop.

The legs are removed, and the universal press frame is secured to the lower platten. By these means, the universal press frame becomes the female blanking die, wherein the grid provides a "table" temporarily to support the blanked-out cartons, but which enable such cartons to be pushed through the apertures.

The template also provides the male blanking die. The description of converting the template to a male blanking die is completely described in the above-identified co-pending Canadian Patent Application No. 2,259,785 and so need not be further described here. Nevertheless for the purpose of completeness, such conversion may be described as follows. The male blanking die is provided from the template. The template, which has had the cylindrical devices removed from the upper surface thereof, is now placed against the upper (movable) plates of the press by means of being accurately-positioned with screws fitted into the apertures from which the cylindrical members have been removed. The foam plastic blocks are each shaped to coincide with the shape of the blanked carton. During the movement of the male blanking die, the blocks push the blanked cartons through the apertures.

The description of the foam plastic blocks is given in the above-identified co-pending Canadian Patent Application No. 2,259,785, and so need not be further described here. Nevertheless, as described on such co-pending Canadian Patent Application the foam plastic blocks may be as unitary blocks, or at least some of the foam plastic blocks divided transversely into two longitudinally slidable blocks. These sub-divided foam plastic blocks may be slid longitudinally in order to adjust the offset between the foam blocks and the openings in the female blanking die. This, thereby, enables adjustment of the shear for breaking the nicks in the sheet containing the plurality of carbon blanks which have been die-cut by the die cutting machine.

In operation, a sheet is fed into the die cutting machine and is gripped at its leading edge by a gripper bar. The sheet is then "pulled" through the die cutting machine, first to the die cutting operation. During the die cutting operation, an array of blanks is stamped onto the sheet for later separation, and the die-cut sheet is then pulled to the stripping station. At the stripping station, much of the excess and the surplus material on the stamped sheet is removed. However, the die-cut blanks are held together by a thin wall or "nick". After stripping, the web and suspended blanks are next pulled to the blanking station, for separation into unattached box blanks and web portions for disposal. In particular, the stripped sheet is urged over the female blanking die portion. The sheet lies flush against the female blanking die surface. The male blanking die and attendant die members are pressed against the female die, with holders temporarily-engaging the sheet to prevent its movement, and the blanks are forced through the holes through the female cutting die and are separated from the web. Upon completion of the blanking operation, the carton blank is then pushed through proper sized holes in the female blanking die onto a pallet or stack, therebelow.

The blanking operation, thus, serves to separate the actual carton blanks from the suspending web portion using the upper male die/lower female die combination. The female blanking die includes a series of blanking holes, matching the profile of the die-cut lay-out of the blanked cartons. The female blanking die further provides support for the sheet or web as it crosses the upper faces of the female blanking die. The stamped sheet is supported by the female blanking die. In the operation of the blanking dies, the upper male die is pressed downward, with the holders temporarily-holding the sheet against movement, and through the corresponding through holes in the female die, thereby separating and pushing through the die-cut carton blanks through the corresponding through holes in the female die, and leaving the web on the surface of the female die.

It is then necessary to automatically remove the remaining web from the female die face portion by use of conventional travelling bar and grippers.

The following description now provides a full detailed description of the various components which are used for the setting-up of the female blanking die of aspects of this invention.

The rail connector element 400 is shown in FIG. 4, FIG. 5, and FIG. 6. The rail connector element 400 is a generally inverted "L"-shaped member 401 including a reposed upper leg block 402 and a depending arm block 8403.

Upper reposed leg block 402 includes a through hole 8404 extending from its front face 8405 to its rear face 406. Depending arm block 8403 includes a through hole 408 extending from its inner end face 409 to its outer end face 410.

In use, the rail connecting element 400 is placed at the inner intersection of a rear rail 202 and of a side rail 203, with the upper reposed leg block 402 against the internal dovetail groove 210 in the side rail 203 and the depending arm block 8403 against the groove 205 in the rear rail 202. A suitable bolt 407, e.g., an Allen-head bolt, is inserted through the through hole 408 and is threaded into a trapezoidal nut 411 which is inserted in the internal dovetail groove 205 in the rear rail 202. Similarly, a suitable bolt 407A, e.g., an Allen-head bolt, is inserted through the through hole 8404 and is threaded into a trapezoidal nut 411A which is inserted in the internal dovetail groove 210 in side rail 203. Complete tightening of the suitable bolts 407, 407A e.g., Allen-head bolts, secures the rear rail 202 to the side rail 203.

In a similar fashion, the remaining three intersecting corners are locked together. This provides a complete, rigid rectangular frame consisting of the universal press frame of the required dimensions.

Figure 7:
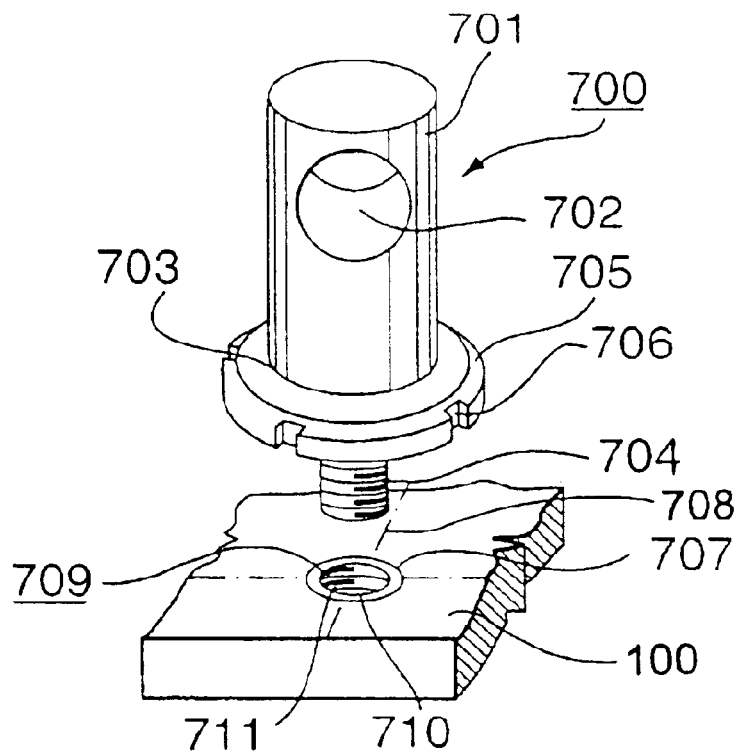
Figure 8:
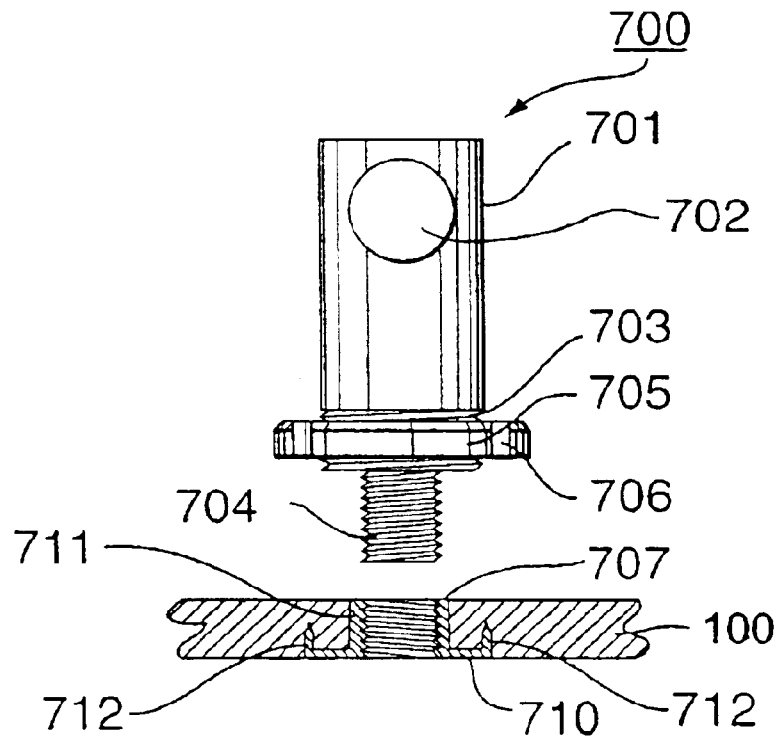

FIG. 7 and FIG. 8 show an embodiment of the centre line orientation cylinders 700. Each centre line orientation cylinder 700 includes an upper barrel 701, which is provided with a diametrical through hole 702. The upper barrel 701 terminates in a lower threaded end 703. The lower threaded end 703 extends downwardly to an integral depending threaded base 704. An internally-threaded, disc-like, lock collar 705, which includes a plurality of circumferentially-arranged engagement nicks 706 and is threaded onto the terminal-threaded end 703 of the upper barrel 701.

As noted hereinabove, the template 100 is provided with a securement hole, e.g., now designated 707, for each of the front and rear centre line orientation cylinders 700, the securement hole, e.g., 707, being along the centre line 708 as provided by the CAD program. A "T"-nut 709 is secured within each hole 707. It is noted that the "T"-nut 709 includes a circular, disc-like base 710 from which an internally-threaded upright cylinder 711 extends. The circular, disc-like base 710 is provided with a plurality, e.g., four, upwardly-projecting teeth 712. The "T"-nut 709 is secured to the template 100 by inserting the internally-threaded upright cylinder 711 into the pre-drilled securement hole 707, in the template 100, and then is hammered "home", so that the upwardly-projecting teeth 712 project into the wood of the template 100, to secure the "T"-nut 709 to the template 100.

In use, the front and rear centre line orientation cylinders 700 are loosely-threaded into their associated "T"-nuts 709. When the diametrical through holes 702 are lined-up, the interiorly-threaded disc-like lock collar 705 is threaded to engage the top surface of the template 100 frictionally. The centre line orientation cylinders 700 are, thus, secured at that correctly-oriented position by means of interiorly-threaded disc-like lock collar 705. The cylindrical centre line rod 105 is then inserted through the diametrical through holes 702 to extend beyond the centre line orientation cylinders 700, as shown in FIG. 1, in which the orientation cylinders are shown with reference numeral 106.

FIGS. 9 to 13 show one embodiment of a centre line orientation bracket.

Figure 9:
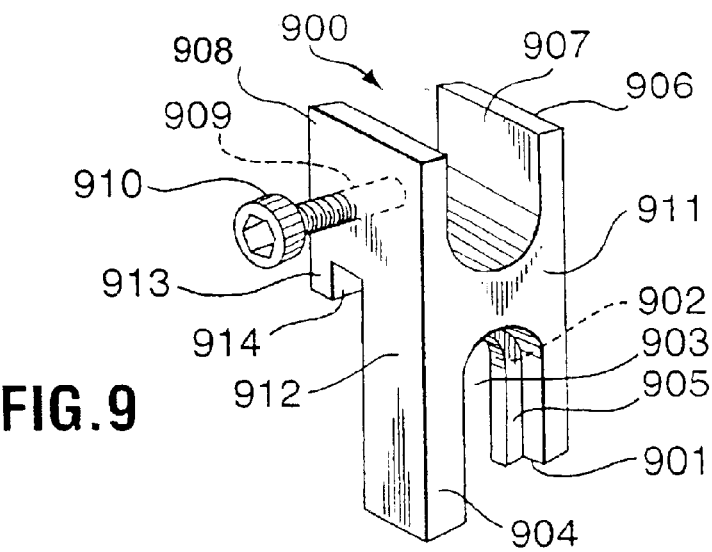
Figure 10:
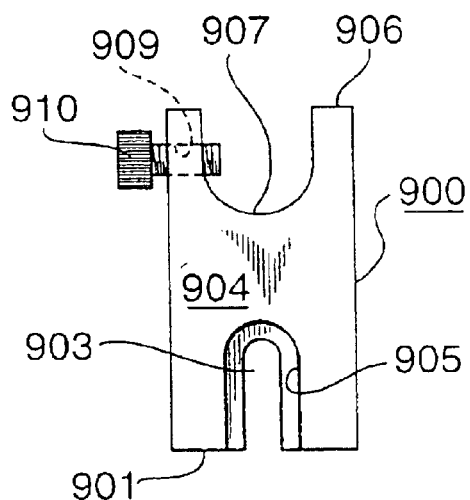
Figure 11:
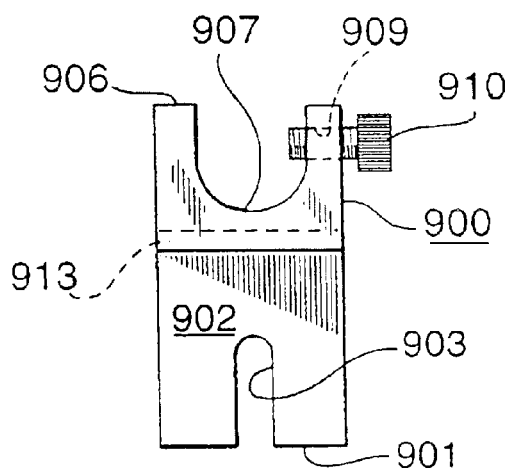
Figure 12:
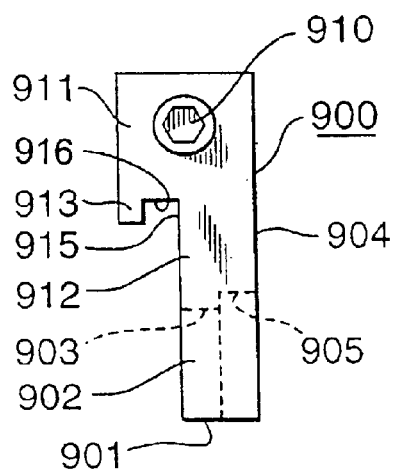
Figure 13:
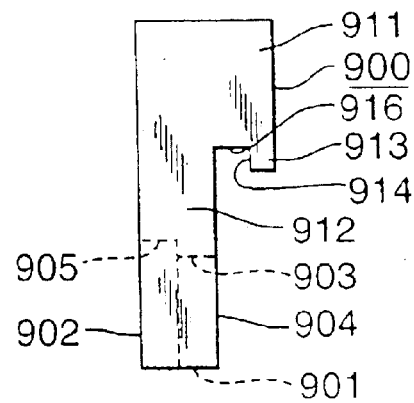

FIG. 9 shows the centre line orientation bracket 900. Each centre line orientation bracket 900 is generally of rectangular front and rear elevational appearance. The lower edge 901 is provided, in its interior face 902, with an upwardly-extending slot 903, and in its exterior face 904, with a similar, but larger countersunk slot 905. The upper edge 906 is provided with a semi-cylindrical cradle 907. One side edge 908 of the centre line orientation bracket 900 adjacent to its upper end is provided with an internally-threaded aperture 909, into which is threaded a suitable bolt 910, e.g., an Allen-head bolt. This suitable bolt 910, e.g., an Allen-head bolt, may be used to lock a cylindrical centre line rod 105 (as shown in FIG. 1) in the cradle 907, if desired.

The upper portion 911 of the centre line orientation bracket 900 is thicker than the lower leg 912 thereof. The slots 903,905 are within the lower leg 912 of the centre line orientation brackets 900. The interior face 902 of the upper portion 911 includes a downwardly-depending flange 913 defining, between the inner edge 914 of the downwardly-depending flange 913 and the outer edge 915 of the lower leg 912, an attachment groove 916, which is adapted to fit into an upper flange 917 (as shown in FIG. 1) on the front rail 201 and the rear rail 202.

In use, two centre line orientation brackets 900, namely the front and rear centre line orientation brackets 900, are lowered onto a respective suitable bolt, e.g., an Allen-head bolt, which is loosely-threaded into an internally-threaded trapezoidal nut, which is slidably-retained within the dovetail-shaped internal groove 205 in the front rail 201 and the rear rail 202, respectively, so that they are slidably-secured to the front rail 201 and to the rear rail 202, respectively.

The so-placed front and rear centre line orientation brackets 900 are also placed so that their attachment grooves 916 fit into the corresponding upper flanges on the front rail 201 and the rear rail 202, respectively. The centre line orientation brackets 900 are then slid until they are disposed at the precise centre of the front rail 201 and of the rear rail 202, respectively. Then, the suitable bolts, e.g., Allen-head bolts, are completely-screwed into the internally-threaded trapezoidal nuts, whereby the front and rear centre line orientation brackets 900 are firmly-secured at the precise centre line of the universal press frame 200.

FIGS. 14 to 18 show views of the template corner clamp 1700, which is also shown in FIGS. 1 and 2. Each template corner clamp 1700 includes an upper "L"-shaped shaped component 1701 and a lower "L"-shaped component 1750. The upper "L"-shaped component 1701 includes a horizontal plate 1702 which includes a closed-ended, race-track-shaped slot 1703 therethrough near its outer end, and a vertical depending leg 1704. The vertical depending leg 1704 includes a countersunk, longitudinally-extending threaded aperture 1705. The inner face of the vertical depending leg 1704 includes a longitudinally-extending channel 1706 therein.

The lower "L"-shaped component 1750 includes a horizontal arm 1751 which is provided with a longitudinally-extending, internally-threaded hole 1752 extending from its outer face, and a vertical depending leg 1753. The vertical depending leg 1753 includes a slit 1754 extending upwardly from the lower edge 1755 thereof, to provide a wide outer ledge 1756 and a narrow inner ledge 1757 defining a springingly-movable wall 1758. The outer face 1759 is provided with an internally-threaded hole 1760 extending completely transversely through the wide outer ledge 1756 and extending into the slit 1754.

In use, the template corner clamp 1700 is first assembled. This is done by placing the outer face of the lower "L"-shaped component 1750 into the longitudinally-extending channel 1706 of the upper "L"-shaped component 1701. Then, a suitable bolt 1707, e.g., an Allen-head bolt, is threaded through the countersunk, longitudinally-extending threaded aperture 1705 in the vertical depending leg 1704 of the upper "L"-shaped component 1701 fully into the internally threaded hole 1752 in the lower "L"-shaped component 1750.

Then, the assembled template corner clamp 1700 is dropped down to be placed atop a side rail 203 (shown in dot-and-peck), with the space between the inner face 1709 of the upper "L"-shaped component 1701 and the inner face 1761 of the lower "L"-shaped component 1750 providing an interference fit for the side rail 203. Then, a suitable bolt 1762, e.g., an Allen-head bolt, is threaded through the internally-threaded hole 1760 in the lower "L"-shaped component 1750 until it abuts the inner face 1763 (see FIG. 14) of the slit 1754.

The template corner clamp 1700 is then slid along the side rail 203 to the appropriate pre-determined datum position, as defined by the CAD program. The suitable bolt 1762, e.g., the Allen-head bolt, is then completely-tightened, to provide a secure frictional engagement between the template corner clamp 1700 and the side rail 203.

Figure 15:
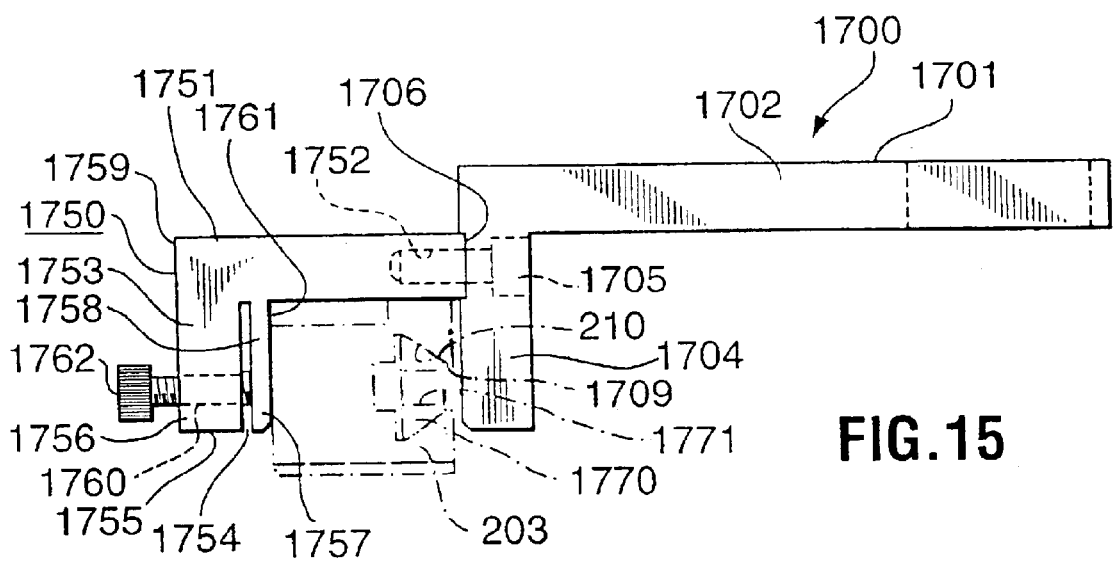
Figure 16:
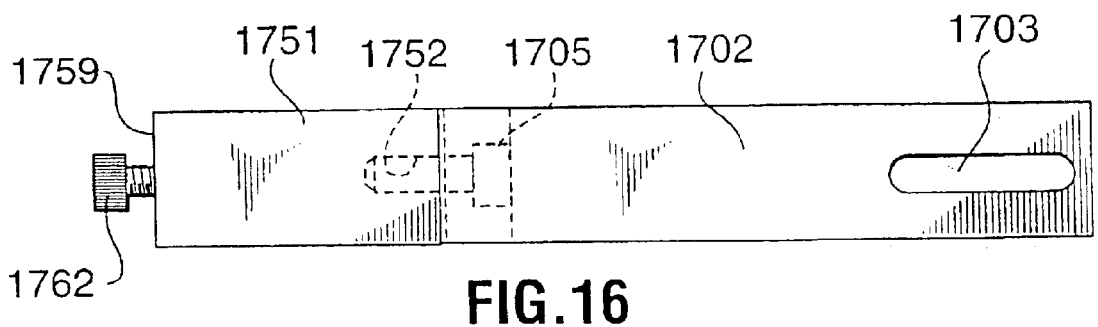
Figure 27:
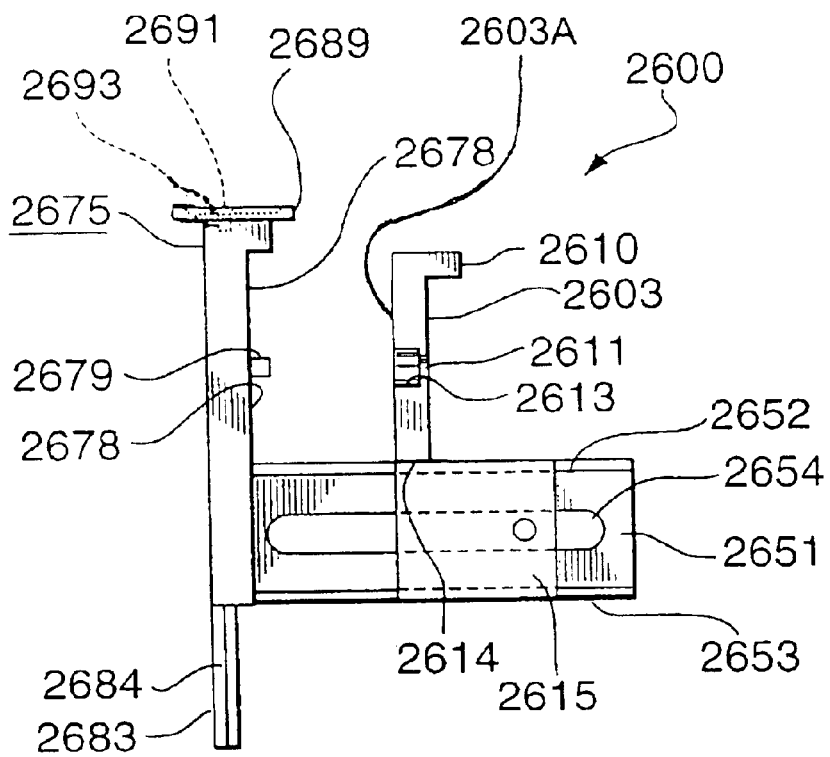
Figure 28:
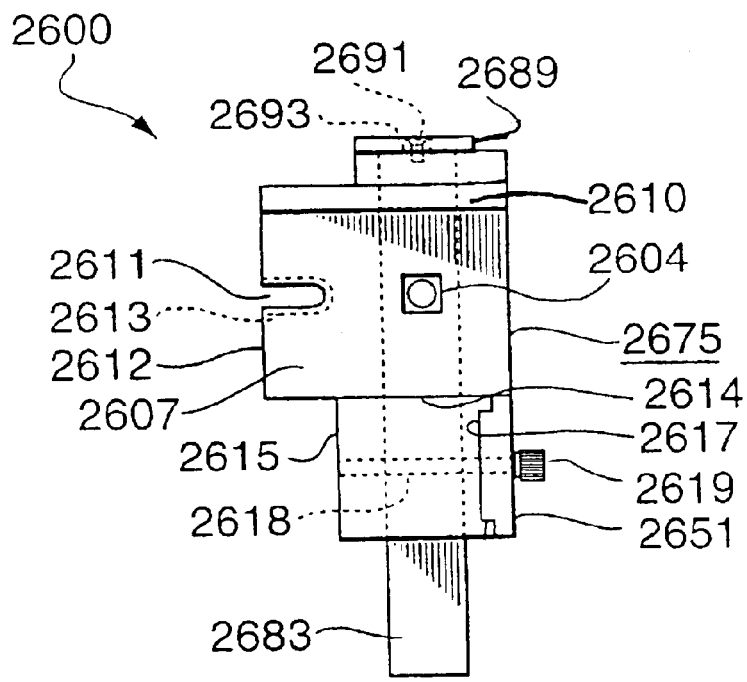

Incidently, FIG. 15 also shows the internal dovetail groove 210 in the side rail 203, and a trapezoidal nut 1770 with an internally-tapped hole 1771 therein.

FIG. 19 and FIG. 20 show views of the legs 2100 which are used to support the front rail 201 and the rear rail 202 of the universal press frame 200. Each of the legs 2100 is a generally-square, rectangular parallelepiped block 2101, with a longitudinally-extending channel 2102 extending downwardly from the top face 2103 thereof. An interior ledge 2104 is provided adjacent to an interior face 2105 of the block 2101. A longitudinally-extending slot 2106 is provided adjacent to the outer face of the block, to provide an exterior ledge 2108 and an intermediate, springingly-movable wall 2109. The outer face 2107 of the block 2101 is provided with an internally-threaded through hole 2110, into which is threaded a suitable bolt 2111, e.g., an Allen-head bolt.

In use, the front rail 201 or the rear rail 202 is inserted downwardly into the longitudinally-extending channel 2102. The relative dimensions of the longitudinally-extending channel 2102 and of the rails 201,202 are such that there is an interference fit therebetween. However, to lock the rails 201,202 to each leg 2100, the suitable bolt 2111, e.g., the Allen-head bolt, is screwed into contact with a hidden face 2112 of the intermediate, springingly-movable wall 2109. Continued screwing springingly-deforms the intermediate, springingly-movable wall 2109 to cause a greater frictional engagement between the rails 201,202 and the associated leg 2100.

FIGS. 21 to 23 show views of a preferred embodiment of a side rail jogger member 2300 and/or rear rail jogger member 2300. Such jogger member 2300 includes a main upright base 2301, an adjustable support member 2355 and a guiding member 2365.

Main upright base 2301 is a generally-rectangular plate 2302, having parallel side faces, one of which is represented as 2303, providing an interior face and an exterior face on the opposing side, as well as an upper edge 2305 and a lower edge 2306. The upper edge 2305 is provided with downwardly-depending slot 2307, which provides an inner block-like portion 2308, and an outer block-like portion 2309. The outer block-like portion 2309 is provided with a transverse, internally-threaded hole 2310, extending through to the slot 2307, into which is threaded a suitable bolt 2311, e.g., an Allen-head bolt.

The lower end 2312 of the main upright base 2301 is provided with an upwardly-extending notch 2313, into which is secured a dovetail block 2314, whose structure will be described hereinafter, by means of a suitable bolt 2315, e.g., an Allen-head bolt, which is threaded into an internally-threaded aperture 2316 in the interior face 2317 of the notch 2313.

The dovetail block 2314 is a two-piece, generally-rectangular, parallelepiped block, which is constituted by a major fixed piece 2319 and a minor, slidable block 2335. The major fixed piece 2319 is a block having an upper roof 2321, an inner wall 2323 having an inner face, an outer face 2324 and a minor roof 2325. The lower edge of block 2314 is flush with the lower edge 2306 of the lower end 2312 of the main upright base 2301. The outer face 2324 includes a major floor 2326, terminating in a downwardly-extending projection 2327 which constitutes the lower half of a dovetail 2328. The upper edge 2329 of the lower half of the dovetail 2328 is flush with floor 2340. The minor roof 2325 is provided with a downwardly-depending flange 2331, so that a groove is formed between the outer face of the inner wall 2323 and the inner face of the downwardly-depending flange 2331. This groove accommodates the suitable bolt 2315, e.g., an Allen-head bolt, which secures the major fixed piece 2319 of the dovetail block 2314 to the main upright base 2301.

The dovetail block 2314 further includes a minor piece in the form of a slidable block 2335 including an inner face 2337, an outer face 2338, an upper roof 2339, and a lower floor 2342. The outer face 2338 includes an upwardly-extending projection 2341 which constitutes the upper half of the dovetail 2328 and which terminates in a front face 2343. The front face 2343 of the upwardly-extending projection 2341 is flush with the lower floor 2342. The upper roof 2339 is provided with a downwardly-extending, internally-threaded hole 2344 which extends through the lower floor 2342. A suitable bolt 2345, e.g., an Allen-head bolt, is threaded into the hole 2344.

The central portion 2346 of the main upright base 2301 is provided with a transversely-extending channel 2347, which is inset into one side face 2348 thereof. That side face 2348 is provided with a pair of longitudinally-spaced-apart, internally-threaded apertures 2349. This pair of longitudinally-spaced-apart, internally-threaded apertures 2349 are fitted with suitable bolts 2350, e.g., Allen-head bolts. The adjustable support member 2355 (to be described hereinafter) is adapted to be fitted within the transversely-extending channel 2347.

The adjustable support member 2355 includes a pair of vertically-spaced-apart, longitudinally-extending slots 2356, 2357, the spacing of the slots being the same as the spacing of the longitudinally-spaced-apart, internally-threaded apertures 2349 in the main upright base 2301. The adjustable support member 2355 is slidably-retained with respect to the main upright base 2301 by the threading of the suitable bolts 2350, e.g., Allen-head bolts, which pass through the respective longitudinally-extending slots 2356,2357 and into the respective longitudinally-spaced-apart, internally-threaded apertures 2349. The interior end face 2358 of the adjustable support member 2355 is provided with a tapped aperture 2359 by means of which the adjustable support member 2355 may be attached to the guiding member 2365 by means of a suitable bolt 2360, e.g., an Allen-head bolt.

The guiding member 2365 is a generally-rectangular, parallelepiped member 2366, whose interior face 2367 is provided with vertically-extending channel 2368 therein. The interior end face 2358 of the adjustable support member 2355 is fitted into the vertically-extending channel 2368, and is then secured therein by means of suitable bolts 2360, e.g., Allen-head bolts, which is threaded into the tapped aperture 2359 in the interior end face 2358 of the adjustable support member 2355. The exterior face 2369 of the guiding member 2365 provides a guiding edge. Within the exterior face 2369 is a guiding member 2370. The guiding member 2370 includes a main vertical bar 2371 including a central groove 2372 which is provided with lateral underscored groove 2773. The exterior face 2369 includes flanges which are complementary with underscored grooves 2373 so that the guiding member 2370 is slidably-held to exterior face 2369 by means of the same suitable bolt 2360, e.g., an Allen-head bolt, which is threaded into a tapped aperture 2359 in the interior face 2358 of the adjustable support member 2355.

A cap 2375 is selectively-adjustably held to the exterior face 2369 of guiding member 2365 by means of screw 2376 into a tapped aperture 2377 in its exterior face 2369, the screw 2376 being within slot 2378 in the cap 2375.

In use, the jogger member 2300 is placed in the rail 202,203,204 by inserting the secured major fixed piece 2319 of the dovetail block 2314 into the dovetail groove 205 or 210 in the rail 202,203,204, by being tilted at a suitable angle to enable such insertion. Then, the slidable block 2335 of the dovetail block 2314 is inserted into the dovetail groove 205 or 210, and is slid until it mates with the major fixed piece 2319 to form a complete dovetail 2328, as a dovetail block 2314. The suitable bolt 2345, e.g., the Allen-head bolt, is then loosely-threaded to hold the dovetail block 2314 as an integral unit. The jogger member 2300 is then placed in its required position on the rail 202,203,204 according to the shape of the template 100. Then, the suitable bolt 2345, e.g., the Allen-head bolt, is completely-threaded, to expand the complete (two-piece) dovetail 2328 into the dovetail groove 205 or 210 and thereby to fix the jogger member 2300 in its accurately-placed position.

The adjustable support member 2355 is then advanced inwardly so that the guiding member 2365 abuts a pre-selected edge of the template 100. The adjustable support member 2355 is fixed in that position by tightening the two spaced-apart bolts 2350 into the longitudinally-spaced-apart, internally-threaded apertures 2349 in the main upright base 2301.

The cap 2375 is then adjusted so that it extends a small distance over the edges of the template 100, so as to provide a temporary support for the perimetrical edges of a blanked sheet.

FIGS. 24 to 28, show another variant of the jogger member 2600 which is particularly-adapted to be used as a front jogger member to be secured to a front rail 201. It includes a main upright base member 2601, an adjustable support member 2650 and a guiding member 2675.

Main upright base member 2601 is a primary, generally-rectangular plate 2602, having outer 2603 and inner 2603A generally-rectangular faces and a free side edge 2605. These outer 2603 and inner 2603A generally-rectangular faces are pierced by a square hole 2604. The opposed side edge is integral with a secondary rectangular plate 2607, having outer 2608 and inner 2609 generally-rectangular faces, outer faces 2603 and 2608 are flush with one another. The outer face 2308 is provided with an integral upper projecting flange 2610. The outer face 2608 is also provided with a closed-ended slot 2611 extending inwardly from a free side edge 2612 of the secondary rectangular plate 2607, and the inner face 2609 is provided with a similar countersunk, slightly-larger slot 2613. The lower end 2614 of the secondary rectangular plate 2607 is cut away to reveal a lower cubic block 2615, which is also integral with the outer face 2603,2608 of the main upright base member 2601. The secondary rectangular plate 2607 is approximately twice as thick as the primary plate, main upright base member 2601. Finally, the free side edge 2605 and the front face of the cubic block 2615 are provided with a connected, transversely-extending channel 2617. That front edge 2605, as well as the front face of the cubic block 2615, are provided with a tapped aperture 2618 by means of which the adjustable support member 2650 may be slidably-attached by way of suitable bolts 2619, e.g., Allen-head bolts.

The adjustable support member 2650 comprises a horizontal leg 2651 which is of the same height as the transversely-extending channel 2617. The horizontal leg 2651 includes upper 2652 and lower 2653 longitudinal cut-outs which cooperate with the complementary channel in the front edge of the primary generally rectangular plate 2602, main upright base member 2601 and in the lower cubic block 2615. It also includes a longitudinally-extending slot 2654 by means of which it may be slidably-adjustably held to main upright base member 2601 by means of suitable bolts, e.g., Allen-head bolts, which are disposed within tapped apertures in the main upright base member 2601. As well, the butting edge of the adjustable support member 2650 is provided with tapped apertures by means of which it may be secured to the guiding member 2675.

The guiding member 2675 is a generally-rectangular, vertically-upright plate 2676, whose width is substantially-equal to the width of the primary plate, and the main upright base member plate 2601. The generally-rectangular, vertically-upright plate 2676 includes an outer face 2677 and an inner face 2678, as well as a top roof 2690 and a lower edge 2680. The inner face 2678 includes a square protrusion 2679 for accurate fitting into the square hole 2604 in the inner face 2603A of the main upright base member 2601.

The outer face 2677 includes a central groove 2681 which is provided with lateral underscored grooves 2682. A guiding plate 2683 includes flanges 2684 which are complementary with the underscored grooves 2682. The guiding plate 2683 is slidably attached by means of suitable bolt 2685, e.g., an Allen-head bolt, which is screwed into an aperture in the central groove 2681. It is seen that guiding plate 2683 can move freely-downwardly by gravity. In addition, the central groove 2681 is provided with further apertures, into which suitable bolts, e.g., an Allen-head bolts, are threaded into internally-threaded apertures in the abutting edge of the adjustable support member 2650, in order to hold the adjustable support member 2650 securely to the guiding member 2675.

A cap 2689 is selectively-adjustably held to the top roof 2690 of the generally-rectangular, vertically-upright plate 2676 by means of a screw 2691 which is threaded into a tapped aperture 2692 in the top roof 2690, the screw 2691 being within a slot 2693 in the cap 2689.

In use, the jogger member 2600 is placed on the rail 201 by being slid longitudinally onto inwardly-projecting bolts, e.g., Allen-head bolts, which have been loosely-threaded into internally-threaded trapezoidal nuts within dovetail-shaped groove 205 in the rail 201.

The jogger member 2600 is then placed in its required position on the rail 201 according to the shape of the template 100. Then, the suitable bolt, e.g., the Allen-head bolt, is completely-threaded, to fix the jogger member 2600 in its accurately-placed position.

The adjustable support member 2650 is then advanced inwardly to abut the pre-selected edge of the template 100, as required to break the nicks in a blanked carton. The adjustable support member 2650 is fixed in that position by tightening inwardly projecting bolts into spaced-apart, internally-threaded apertures in the main upright base member when in position.

The cap 2689 is then adjusted so that it extends a small distance over the edges of the template 100 so as to provide a temporary support for perimetrical edges of a blanked sheet.

Figure 29:
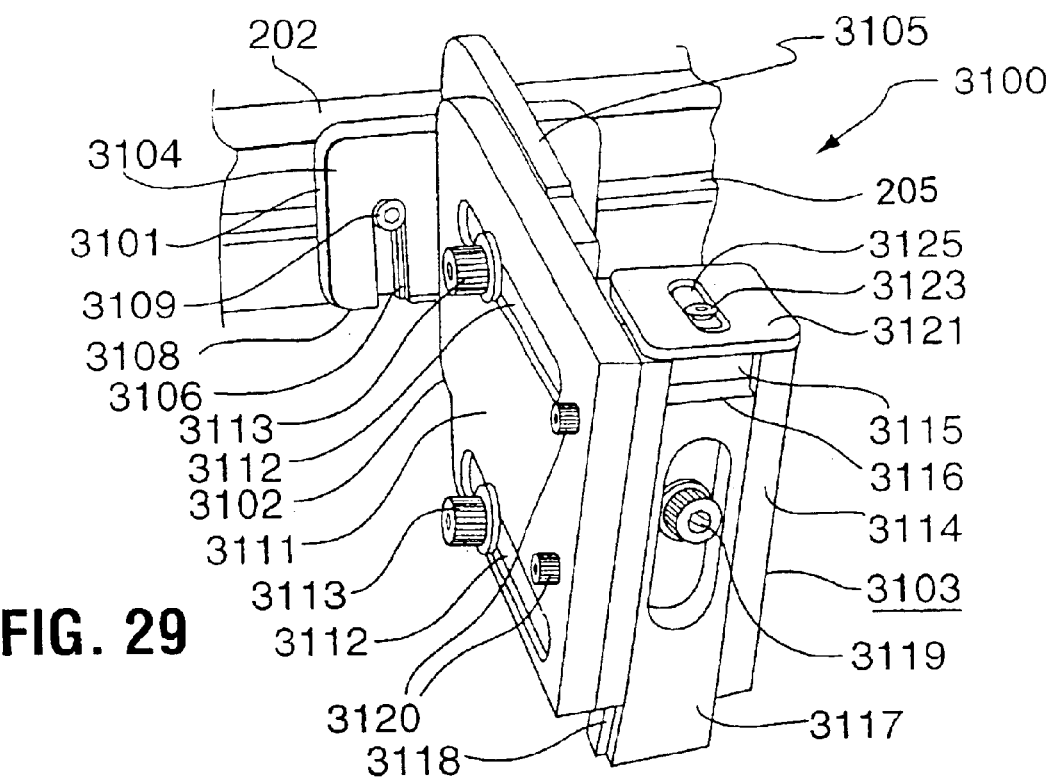
Figure 30:
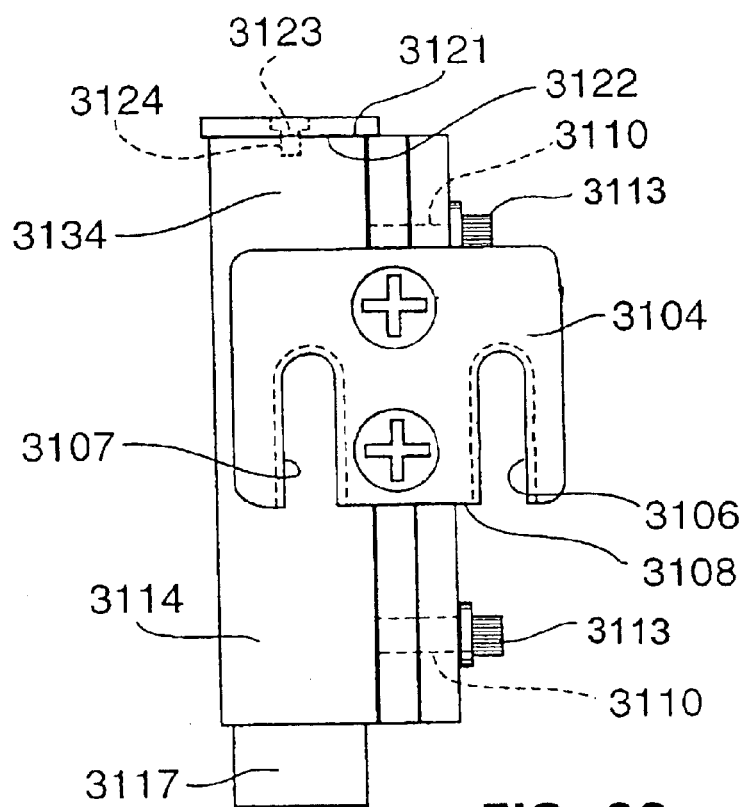

FIGS. 29 and 30 show another embodiment of the jogger member 3100. This jogger member 3100 includes a main upright base member 3101, an adjustable support member 3102 and guiding member 3103. Main upright base member 3101 is in the form of a "T" element, including a transverse plate 3104, which is integrally-connected to a longitudinally-extending plate 3105. The transverse plate 3104 includes a pair of spaced-apart slots 3106,3107 extending upwardly from the bottom edge 3108 of the transverse plate 3104. The transverse plate 3104 is attached to the rail by being dropped vertically-downwardly into suitable bolts 3109, e.g., Allen-head bolts, which are loosely-threaded into respective internally-threaded trapezoidal nuts which are disposed in the dovetail-shaped groove 205 in the rail 202.

The longitudinally-extending plate 3105 is provided with two, vertically-spaced-apart, tapped apertures 3110 whose purpose will be explained later.

The adjustable support member 3102 comprises a generally-rectangular plate 3111. Such generally-rectangular plate 3111 includes a pair of longitudinally-extending, vertically-spaced-apart parallel slots 3112. Lock bolts 3113, e.g., Allen-head bolts, pass through the respective slots, and enter the above-mentioned vertically spaced-apart tapped apertures 3110 in the longitudinally-extending plate 3105.

When the adjustable support member 3102 is disposed in its desired position with respect to the universal press frame 200 and the template 100, the lock bolts 3113, e.g., Allen-head bolts, are tightened to lock the generally-rectangular plate 3111 in position.

The guiding member 3103 includes a main vertical bar 3114 including a central groove 3115 which is provided with lateral underscored groove 3116. A guiding plate 3117, which include flanges 3118 which are complementary with underscored grooves 3116 is slidably-held to the central groove 3115 in the main vertical bar 3114 by means of a suitable bolt 3119, e.g., an Allen-head bolt, which is screwed into an aperture (not seen) in the central groove 3115. The main vertical bar 3114 is secured to the adjustable support member 3102 by means of two vertically-spaced apart bolts 3120, e.g., Allen-head bolts, which are threaded into tapped apertures (not seen) in one face of the guiding member 3103.

A cap 3121 is selectively-adjustably-held to the top face 3122 of the main vertical bar, 3114 by means of screw 3123 which is screwed into a tapped aperture 3124 in the top face 3122, the screw 3123 being within slot 3125 in cap 3121.

The jogger member 3100 is placed on the rail 202 by being dropped vertically onto the inwardly-projecting bolts 3109, e.g., Allen-head bolts, which have been loosely-threaded into the internally-threaded trapezoidal nuts within the dovetail-shaped groove 205. When the jogger member 3100 is in its designated position along the rail 202 (or alternatively 203,204), these Allen-head bolts 3109 are completely tightened.

The jogger member 3100 is then placed in its required position on the rail 202 according to the shape of the template 100. Then, the suitable bolts 3109, e.g., the Allen-head bolts, are completely-threaded, to fix the jogger member 3100 in its accurately-placed position.

The adjustable support member 3114 is then advanced inwardly to abut the pre-selected edge of the template 100. The guiding member 3103 is fixed in that position by tightening the two spaced-apart bolts 3113 into the spaced-apart, internally-threaded apertures 3110 in the longitudinally-extending plate 3105 in the main upright base member 3101.

The cap 3121 is then adjusted so that it extends a small distance over the edges of the template 100, so as to provide a temporary support for perimetrical edges of a blanked sheet.

Figure 31:
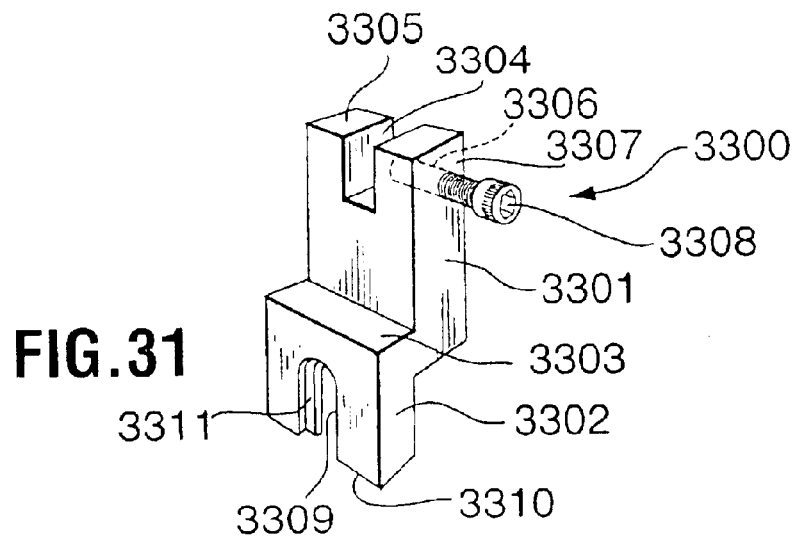
FIG. 31 is a perspective view of one embodiment of a grid orientation bracket.

FIG. 31 shows in perspective one embodiment of a grid support bracket 3300, also illustrated in FIG. 2. This grid support bracket 3300 is generally step-shaped and includes an upper vertical arm 3301 and a lower vertical leg 3302, which are joined by a horizontal deck 3303. The upper vertical arm 3301 includes a vertical slot 3304, extending downwardly from its upper edge 3305. A tapped, transverse, through hole 3306 is formed through one side face 3307 of the upper vertical arm 3301, into which is inserted a suitable lock bolt 3308, e.g., an Allen-head bolt. When used in conjunction with the grid 404 (as shown in FIG. 2), the suitable lock bolt 3308, e.g., an Allen-head bolt, is turned until it contacts and locks the grid 404 into the slot 3304.

The lower vertical leg 3302 is of a dimension to enable it to cooperate with the rails 201,202,203,204 of the universal press frame 200. The lower vertical leg 3302 also includes a closed-ended slot 3309 extending upwardly from the lower free edge 3310 thereof. Closed-ended slot 3309 includes a countersunk larger slot 3311.

In use, the grid support bracket 3300 is placed on the rail 201,202,203,204 by being dropped vertically onto projecting bolts, e.g., Allen-head bolts, which have been loosely-threaded into internally-threaded trapezoidal nuts within the dovetail groove 205 or 210 of the rails.

The grid 404 is placed within the upper vertical slot 3404, and is held in that position by completely-threading the lock bolts 3308, e.g., Allen-head bolts. The grid support bracket 3300, which is located in the correct position by the grid 404, is fixed in position by completely-threading the bolt, e.g., an Allen-head bolt, into the internally-threaded trapezoidal nut which is within the dovetail groove 205 or 210 of the rails.

Figure 32:
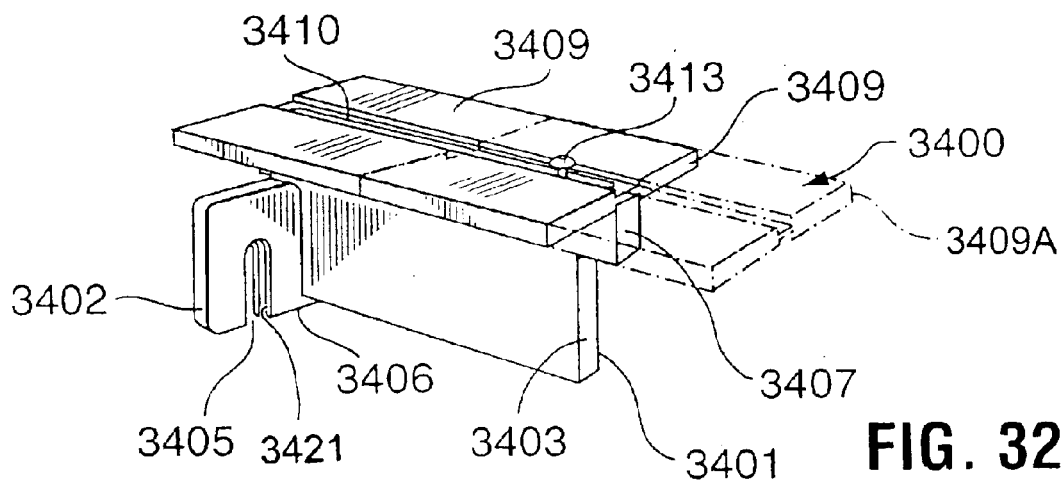
Figure 33:
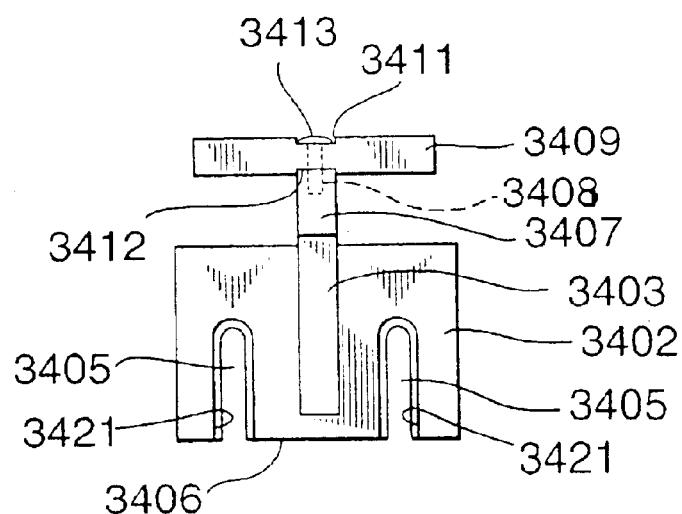

FIGS. 32 and 33 show one embodiment of an auxiliary adjustable support member 3400. This auxiliary adjustable support member 3400 includes a support base 3401 comprising a transverse plate 3402 and an integral longitudinal plate 3403. The transverse plate 3402 is of a dimension enabling it to cooperate with the rails 202,203,204 of the universal press frame 200, by means of two spaced-apart slots 3405 extending upwardly from the lower edge 3406 thereof. Slots 3405 include countersunk larger slot 3421. These slots 3405 are adapted to cooperate with suitable bolts, e.g., Allen-head bolts, which are loosely-threaded into internally-threaded trapezoidal nuts which are slidably-disposed within the dovetail groove 205 or 210 in the rails 202,203,204.

The integral longitudinal plate 3403 includes an integral upper cantilevered block 3407, the upper face 3412 thereof being provided with a tapped aperture 3408.

The auxiliary adjustable support member 3400 includes a captive, longitudinally-slidable table 3409 having a double-closed-ended, longitudinally-extending slot 3410 therein, and upper 3411 and lower grooves 3412 which are complementary to the slot 3410. The longitudinally-slidable table 3409 is held captive on integral upper cantilevered block 3407 by means of a screw 3413. The longitudinally-slidable table 3409 can, thus, be adjusted longitudinally as shown in dot-and-peck lines 3409A.

In use, the auxiliary adjustable support member 3400 is placed onto the rail 202,203,204 by being dropped vertically onto the projecting bolts, e.g., Allen-head bolts, which have been loosely-threaded into internally-threaded trapezoidal nuts within the dovetail groove 205 or 210 therein.

The auxiliary adjustable support member 3400 is then placed in its required position on the rail 202,203,204 according to the shape of the template 100. Then, the bolt, e.g., the Allen-head bolt, is completely-threaded, to fix the auxiliary adjustable support member 3400 in its accurately-placed position.

The captive longitudinally-slidable table 3409 on the so-fixed auxiliary adjustable support member 3400 is then advanced inwardly to extend a small pre-selected distance over an edge of the template 100, by sliding of its slot with respect to the screw. When the captive longitudinally-slidable table 3409 is so-adjusted, it provides an additional temporary support to perimetal edges of a blanked sheet, the screw 3413 is tightened.

Figure 34:
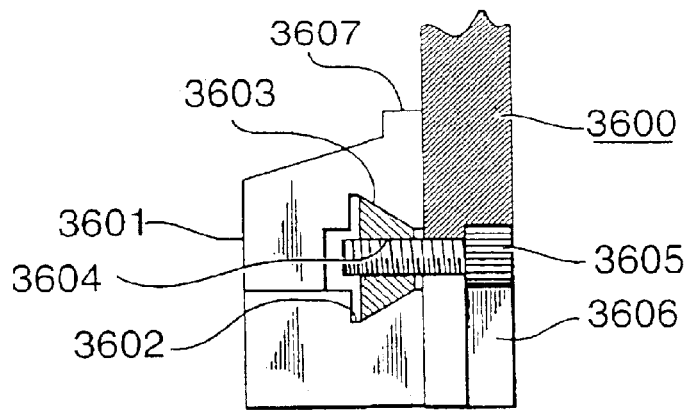
FIG. 34 is a view of the assembly of various elements to the dovetail groove in the rails.

FIG. 34 shows how certain elements of the universal press frame 200 (shown in FIG. 1) and the female blanking die 300 (shown in FIG. 3), namely the centre line clamp 900, the template corner clamp 1700, the front jogger member 3100, the grid orientation bracket 3300 and the auxiliary support member 3400 are secured to the universal press frame 200 and thus, to the female blanking die 300. Such a securing element is generally-designated 3600. The relevant rail is now generally-designated 3601.

It is seen that the rail 3601, is provided with a dovetail groove 3602. Within the dovetail groove 3602 is a trapezoidal nut 3603, which includes an internally-threaded through hole 3604. The trapezoidal nut 3603 is placed within the dovetail groove 3602 and a suitable bolt 3605, e.g., an Allen-head bolt, is loosely-threaded into the internally-threaded through hole 3604.

The securing element 3600 is provided with a slot 3606. The slot 3606 is placed over the engagement end of the suitable bolt 3605, e.g., Allen-head bolt, thereby to hold the securing element 3600 to the rail 3601. When the securing element 3600 is placed in the exact position with respect to the universal press frame 200 as defined by the CAD program, the suitable bolt 3605, e.g., the Allen-head bolt, is completely-screwed into the trapezoidal nut 3603, thereby to lock the securing element 3600 in its designated position.

It is noted that the rail 3601 includes an upstanding flange 3607. This upstanding flange 3607 is to accommodate the previously-described groove in the centre line clamp 900.

Figure 35:
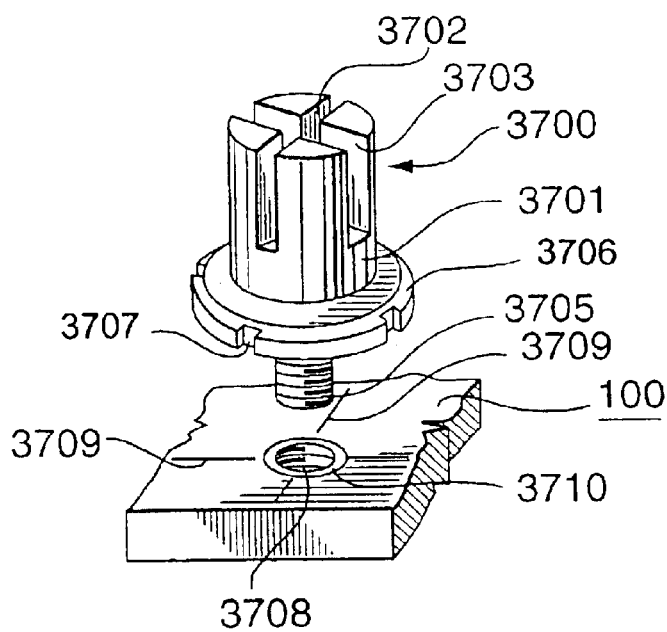
Figure 36:
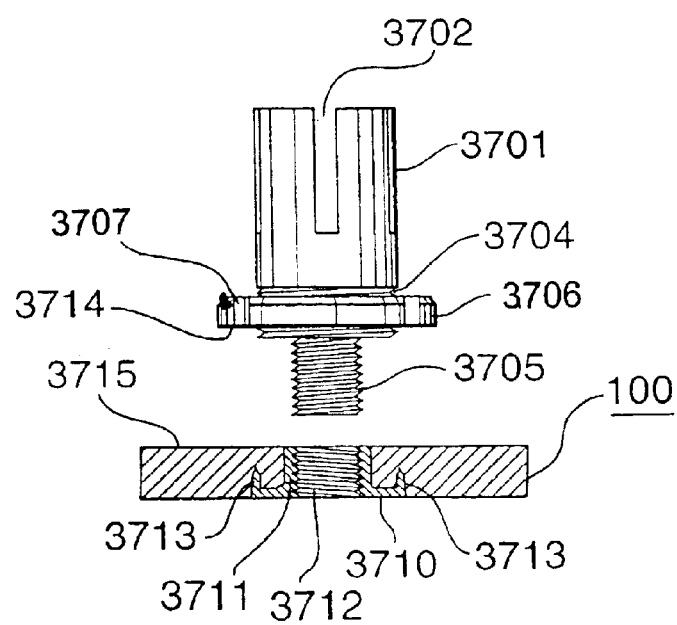

FIGS. 35 and 36 show one embodiment of a grid orientation cylinder 3700. The grid orientation cylinder 3700 includes an upper barrel 3701. Such upper barrel 3701 is provided with a pair of mutually-transverse, upper slots 3702,3703 whose width is different, to accommodate grids formed of two different thicknesses of grid rails 405 (as shown in FIG. 2). The upper barrel 3701 terminates in an integral threaded end 3704, and that end is integral with a depending, integral threaded base 3705. An internally-threaded circular disc-like collar 3706, which includes a plurality of circumferentially-arranged engagement nicks 3707 therearound, is threaded onto the terminal integral threaded end.

As previously noted, the template 100 is provided with a plurality of through holes, e.g., 3708, along the outline 3709 of the blanked cartons, according to the instructions which are provided by the CAD program as previously-described.

A "T"-nut 3710 is secured within each through hole, e.g., 3708. It is noted that the "T"-nut 3710 includes a circular, disc-like base 3711 from which an internally-threaded upright cylinder 3712 extends. The circular, disc-like base 3711 is provided with a plurality, e.g., four, upwardly-projecting teeth 3713. The "T"-nut 3710 is secured to the template 100 by inserting the internally-threaded upright cylinder 3712 into the pre-drilled through hole, e.g., 3708, and then is hammered "home", so that the plurality, e.g., four, upwardly-projecting teeth 3713 project into the wood of the template 100, thereby firmly-securing the "T"-nut 3710 to the template 100.

In use, the grid orientation cylinders 3700 are loosely-threaded into their associated "T"-nuts 3710, and rotated until the selected mutually-transverse, upper slot 3702, or 3703 is orientated to accommodate the grid rails 405. When the mutually-transverse, upper slots 3702,3703 are correctly-oriented, the internally-threaded circular disc-like collar 3706 is screwed-down until its lower surface 3714 abuts the upper surface 3715 of the template 100, to hold the grid orientation cylinders 3700 to the template 100 by friction.

What is claimed is:

1. A jogger member for use in erecting a universal press frame for a female blanking die for a die cutting machine for die cutting and/or blanking a carton blank, said universal press fame including a rectangular framework of connecting rails on which said jogger member is disposed within an internal groove in one of said connecting rails and along an interior perimeter of said rectangular framework, said jogger member comprising:

a) a base member;

b) means which are operatively associated with said base member for selectively securing said jogger member to the interior perimeter of said rectangular framework;

c) an adjustable support member which is adjustably and slidably disposed with respect to said base member; and d) a guiding member having an upper edge and a lower edge, said guiding member being secured to a face of said adjustable support member to provide a depending guiding face for guidance of said jogger member within an internal grove of said rectangular framework.

2. The jogger member as claimed in claim 1, wherein said rail is provided with an internal groove having an upper flange and a lower flange defining said internal groove, and wherein said means (b) comprises an inwardly-directed slot by which said jogger member is adjustably attachable to said rail by a screw or a bolt.

3. The jogger member as claimed in claim 2, wherein said means (b) comprises a transverse plate of a dimension enabling said Jogger member to cooperate with said rails of said rectangular framework, said transverse plate including at least one tapped hole into which a bolt or screw may be threaded to engage said rail of said rectangular framework.

4. The jogger member as claimed in claim 2, including a slidable captive cap having a lead edge, said cap being slidably secured to said guiding member for selective disposition of said leading edge a predetermined cantilevered distance over said guiding face of said guiding member.

5. The jogger member as claimed in claim 4, wherein said slidable captive cap includes a longitudinally-extending slot, wherein a screw is disposed in said slot and is threadedly secured to said upper edge of said guiding member to hold said slidable captive cap to said guiding member, and to secure said slidable captive cap in a selected cantilevered position, and said guiding member includes a supplemental guiding finger having an upper end and a lower end, said supplemental guiding finger being slidably associated with said guiding face of said guiding member, said supplemental guiding finger being slidable between a position in which a lower edge of said finger is flush with a lower edge of said guiding member and a position where said finger extends below said lower edge of said guiding member.

6. The jogger member as claimed in claim 2, wherein said guiding member includes a supplemental guiding finger having an upper end and a lower end, said supplemental guiding finger being slidably associated with said guiding face of said guiding member, said supplemental guiding finger being slidable between (a) a position in which a lower edge of said guiding finger is flush with a lower edge of said guiding member and (b) a position where said guiding finger extends below said lower edge of said guiding member.

7. The jogger member as claimed in claim 6, wherein said supplemental guiding finger includes a longitudinally-extending slot, and wherein said guiding member includes a bolt for securing to said guiding member and which projects into said longitudinally-extending slot to limit said extent of movement of said supplemental guiding finger within said longitudinally-extending slot.

8. The jogger member as claimed in claim 7, wherein said guiding face of said guiding member includes a longitudinally-extending slot within which said supplemental guiding finger is guided to slide, and wherein said supplemental guiding finger is provided with a pair of parallel lateral complementary flanges, whereby said longitudinally-extending slot of said guiding member and said pair of parallel lateral complementary flanges cooperate to hold said supplemental guiding finger within said longitudinally-extending slot of said guiding member, and to provide a slideway for said supplemental guiding finger with respect to said guiding member.

9. The jogger member as claimed in claim 1, wherein said connecting rails are each provided with an internal dovetail-shaped groove which defines said internal groove, and wherein said guiding member includes a supplemental guiding finger having an upper end and a lower end, said supplemental guiding finger being slidably associated with said guiding face of said guiding member, said supplemental guiding finger being slidable between a position in which a lower edge of said guiding finger is flush with a lower edge of said guiding member and a position where said guiding finger extends below said lower edge of said guiding member.

10. The jogger member as claimed in claim 9, wherein said supplemental guiding finger includes a longitudinally-extending slot, and wherein said guiding member includes a bolt which is secured to said guiding member and which project into said longitudinally-extending slot of said guiding finger to limit the extent of movement of said supplemental guiding finger within said longitudinally-extending slot.

11. The jogger member as claimed in claim 9, wherein said guiding face of said guiding member includes a longitudinally-extending slot within which said supplemental guiding finger is guided to slide, and wherein said supplemental guiding finger is provided with a pair of parallel lateral complementary flanges, whereby said longitudinally-extending slot and said pair of parallel lateral complementary flanges cooperate to hold said supplemental guiding finger within said longitudinally-extending slot and provide a slideway for said supplemental guiding finger with respect to said guiding member.

12. The jogger member as claimed in claim 1, wherein said connecting rails are each provided with an internal dovetail-shaped groove defining said internal groove, said member including: (e) a slidable captive cap having a leading edge, said slidable captive cap being slidably secured to said guiding member (d) for selective disposition of said leading edge a predetermined cantilevered distance over said guiding face of said guiding member.

13. The jogger member as claimed in claim 12, wherein said slidable captive cap includes a longitudinally-extending slot, and including a screw which is disposed in said slot and which is threadedly secured to said upper edge of said guiding member to hold said slidable captive cap in a selected cantilevered position.

14. The jogger member as claimed in claim 12, wherein said slidable captive cap includes a longitudinally-extending slot, and including a screw which is disposed in said slot of said cap and which is threadedly secured to said upper edge of said guiding member to hold said slidable captive cap to said guiding member as well as to secure said slidable captive cap in a selected cantilevered position.

\* \* \* \* \*